United States Patent
Zhou et al.

(10) Patent No.: US 11,333,931 B2
(45) Date of Patent: May 17, 2022

(54) LIQUID CRYSTAL DISPLAY PANEL AND DISPLAY DEVICE

(71) Applicant: Tianma Micro-Electronics Co., Ltd., Shenzhen (CN)

(72) Inventors: Jun Zhou, Shanghai (CN); Yuanying Wang, Shanghai (CN)

(73) Assignee: TIANMA MICRO-ELECTRONICS CO., LTD., Shenzhen (CN)

(*) Notice: Subject to any disclaimer, the term of this patent is extended or adjusted under 35 U.S.C. 154(b) by 0 days.

(21) Appl. No.: 17/220,383

(22) Filed: Apr. 1, 2021

(65) Prior Publication Data

US 2021/0223634 A1 Jul. 22, 2021

(30) Foreign Application Priority Data

Dec. 30, 2020 (CN) .......................... 202011612392.9

(51) Int. Cl.
G02F 1/13363 (2006.01)
G02F 1/1335 (2006.01)

(52) U.S. Cl.
CPC .. *G02F 1/133631* (2021.01); *G02F 1/133531* (2021.01); *G02F 1/133633* (2021.01); *G02F 1/133638* (2021.01); *G02F 2413/04* (2013.01); *G02F 2413/05* (2013.01)

(58) Field of Classification Search
None
See application file for complete search history.

(56) References Cited

U.S. PATENT DOCUMENTS

| | | | |
|---|---|---|---|
| 2005/0146659 A1* | 7/2005 | Ishii | G02F 1/1393 349/117 |
| 2009/0161044 A1* | 6/2009 | Ge | G02F 1/133555 349/98 |
| 2009/0290108 A1* | 11/2009 | Nakagawa | G02B 27/145 349/118 |
| 2020/0257166 A1* | 8/2020 | Smith | G02F 1/1368 |
| 2021/0088854 A1* | 3/2021 | Shin | G02F 1/13363 |
| 2021/0215979 A1* | 7/2021 | Wang | G02F 1/133638 |
| 2021/0223634 A1* | 7/2021 | Zhou | G02F 1/133633 |

FOREIGN PATENT DOCUMENTS

| | | |
|---|---|---|
| CN | 102768380 A | 11/2012 |
| CN | 107193152 A | 9/2017 |
| CN | 111033370 A | 4/2020 |

\* cited by examiner

*Primary Examiner* — Ryan Crockett
(74) *Attorney, Agent, or Firm* — Christensen O'Connor Johnson Kindness PLLC

(57) ABSTRACT

A liquid crystal display panel is described. In an embodiment, the liquid crystal panel display includes: a first linear polarizer; a second linear polarizer; a first quarter-wave plate disposed between a first substrate and the first linear polarizer, an angle between a slow axis of the first quarter-wave plate and an absorption axis of the first linear polarizer being 45° or 135'; a second quarter-wave plate disposed between a liquid crystal layer and the first substrate, slow axes of the first quarter-wave plate and the second quarter-wave plate being perpendicular, and absorption axes of the first linear polarizer and the second linear polarizer being perpendicular; a first retardation film disposed between the first quarter-wave plate and the second quarter-wave plate; and a second retardation film disposed at a side of the first quarter-wave plate facing away from the first retardation film, or disposed between the second linear polarizer and the liquid crystal layer.

19 Claims, 24 Drawing Sheets

| | |
|---|---|
| First linear polarizer | 41 |
| Second retardation film | 52 |
| First quarter-wave plate | 11 |
| First retardation film | 51 |
| First substrate | 10 |
| Second quarter-wave plate | 12 |
| Liquid crystal layer | 30 |
| Second substrate | 20 |
| Second linear polarizer | 42 |
| Backlight | 6 |

| First linear polarizer | 41 |
| --- | --- |
| Second retardation film | 52 |
| First quarter-wave plate | 11 |
| First retardation film | 51 |
| First substrate | 10 |
| Second quarter-wave plate | 12 |
| Liquid crystal layer | 30 |
| Second substrate | 20 |
| Second linear polarizer | 42 |
| Backlight | 6 |

| |   |
|---|---|
| First linear polarizer | ~ 41 |
| First quarter-wave plate | ~ 11 |
| First retardation film | ~ 51 |
| First substrate | ~ 10 |
| Second quarter-wave plate | ~ 12 |
| Liquid crystal layer | ~ 30 |
| Second substrate | ~ 20 |
| Second retardation film | ~ 52 |
| Second linear polarizer | ~ 42 |
| Backlight | ~ 6 |

FIG. 9

| First linear polarizer | ~ 41 |
| --- | --- |
| Third retardation film | ~ 53 |
| Second retardation film | ~ 52 |
| First quarter-wave plate | ~ 11 |
| First retardation film | ~ 51 |
| First substrate | ~ 10 |
| Second quarter-wave plate | ~ 12 |
| Liquid crystal layer | ~ 30 |
| Second substrate | ~ 20 |
| Second linear polarizer | ~ 42 |
| Backlight | ~ 6 |

FIG. 20

LIQUID CRYSTAL DISPLAY PANEL AND DISPLAY DEVICE

CROSS-REFERENCE TO RELATED APPLICATIONS

The present disclosure claims priority to Chinese Patent Application No. 202011612392.9, filed on Dec. 30, 2020, the content of which is incorporated herein by reference in its entirety.

TECHNICAL FIELD

The present disclosure relates to the field of display technologies, and more particularly, to a liquid crystal display panel and a display device.

BACKGROUND

With continuous development of display technology, liquid crystal displays have become commonly available products in the display industry. A liquid crystal display panel includes an array substrate, a color film substrate arranged opposite to the array substrate, and a liquid crystal layer disposed between the array substrate and the color film substrate. When the liquid crystal display panel is working, the orientation of the liquid crystal molecules changes under action of an electric field. Accordingly, an intensity of light passing through the liquid crystal molecules will change. Combining the effects of color resists of different colors in the color film substrate, the liquid crystal display panel displays an image having a desired color.

Currently, liquid crystal display panels have poor visual angle characteristics, and an extremely low contrast of the image when observed at a large visual angle. Therefore, a focus for researchers in this field lies in increasing contrast of the liquid crystal display panel observed at a large visual angle.

SUMMARY

In view of this, a liquid crystal display panel and a display device are provided according to embodiments of the present disclosure, to increase contrast of the liquid crystal display panel at a large visual angle.

Accordingly, in an aspect, a liquid crystal display panel is provided according to an embodiment of the present disclosure. In an embodiment, the liquid crystal display includes: a first substrate; a second substrate arranged opposite to the first substrate; a liquid crystal layer disposed between the first substrate and the second substrate; a first linear polarizer disposed at a side of the first substrate facing away from the liquid crystal layer; a first quarter-wave plate disposed between the first substrate and the first linear polarizer, an angle between a slow axis of the first quarter-wave plate and an absorption axis of the first linear polarizer being 45° or 135°; a second quarter-wave plate disposed between the liquid crystal layer and the first substrate, a slow axis of the second quarter-wave plate being perpendicular to the slow axis of the first quarter-wave plate; a second linear polarizer disposed at a side of the second substrate facing away from the liquid crystal layer, an absorption axis of the second linear polarizer being perpendicular to the absorption axis of the first linear polarizer; a first retardation film disposed between the first quarter-wave plate and the second quarter-wave plate; and a second retardation film disposed at a side of the first quarter-wave plate facing away from the first retardation film, or disposed between the second linear polarizer and the liquid crystal layer.

In another aspect, a display device including the liquid crystal display panel described above is provided according to an embodiment of the present disclosure.

BRIEF DESCRIPTION OF DRAWINGS

In order to explain the technical solutions of the embodiments of the present disclosure, the drawings used in the description of the embodiments will be simply introduced in the following. The drawings in the following description are only some of the embodiments of the present disclosure. For those of ordinary skill in the art, other drawings can be obtained based on these drawings without any inventive efforts.

FIG. 9 is a schematic cross-sectional view of another liquid crystal display panel according to an embodiment of the present disclosure;

FIG. 20 is a schematic cross-sectional view of still another liquid crystal display panel according to an embodiment of the present disclosure;

DESCRIPTION OF EMBODIMENTS

For better illustrating technical solutions of the present disclosure, embodiments of the present disclosure will be described in detail as follows with reference to the accompanying drawings.

It should be noted that, the described embodiments are merely exemplary embodiments of the present disclosure, which shall not be interpreted as providing limitations to the present disclosure. All other embodiments obtained by those skilled in the art without creative efforts according to the embodiments of the present disclosure are within the scope of the present disclosure.

The terms used in the embodiments of the present disclosure are only for the purpose of describing the specific embodiments, rather than limiting the present disclosure. The singular forms of "a", "an" and "the" used in the embodiments of the present disclosure and the attached claims are intended to include plural forms as well, unless represented otherwise explicitly in the context.

It should be understood that the term "and/or" used herein is merely an association relationship describing associated objects, indicating that there may be three relationships, for example, A and/or B may represent that three cases, i.e., A existing individually, A and B existing simultaneously, B existing individually. In addition, the character "/" herein generally represents that the related objects before and after the character form an "or" relationship.

It should be understood that, although a retardation film in the liquid crystal display panel may be described using the terms of "first", "second", "third", etc., in the embodiments of the present disclosure, the retardation film will not be limited to these terms. These terms are merely used to distinguish retardation films from one another. For example, without departing from the scope of the embodiments of the present disclosure, a first retardation film may also be referred to as a second retardation film, and similarly a second retardation film may also be referred to as a first retardation film. In addition, according to embodiments of the present disclosure, an orientation of the liquid crystal layer can be understood as an alignment direction of liquid crystals.

In an implementation process of the embodiments of the present disclosure, the inventors found that it is difficult for the liquid crystal display panel to have a large contrast at multiple visual angles due to optical anisotropy of the optical film layer in the liquid crystal display panel and a difference in optical path length when light propagates in different directions.

Figure 1:
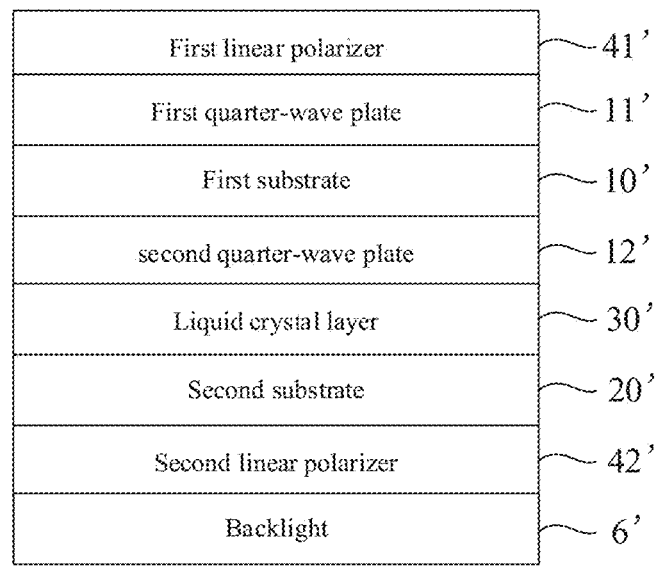
FIG. 1 is a schematic diagram of a conventional liquid crystal display panel.
Figure 2:
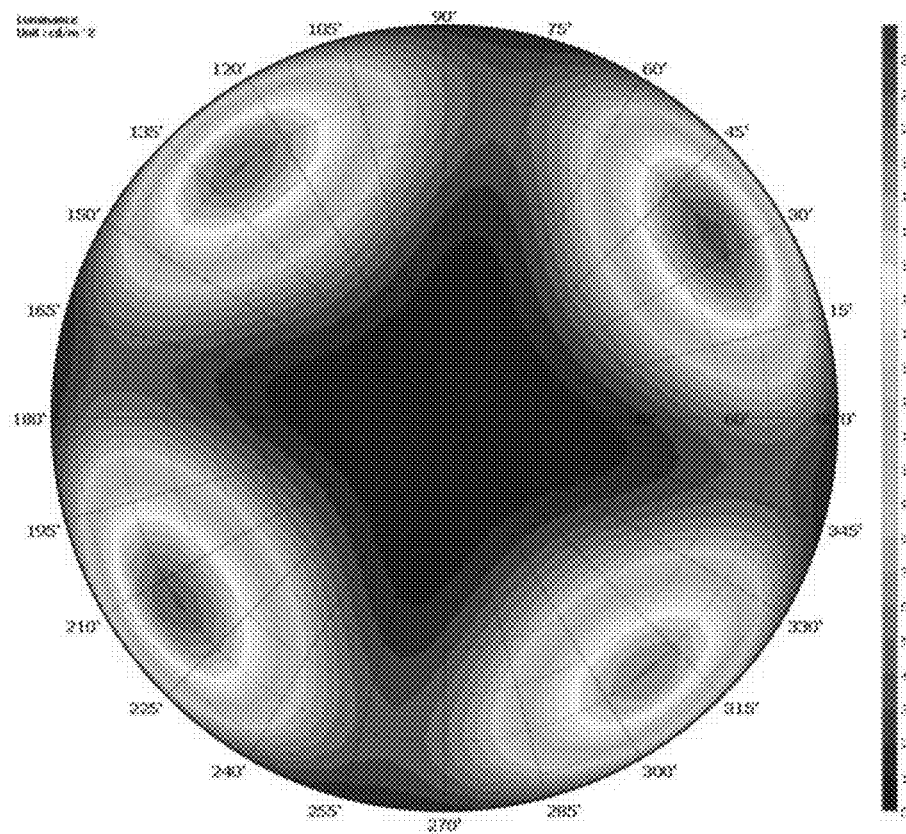
FIG. 2 is a simulation effect diagram of the liquid crystal display panel shown in FIG. 1 at different visual angles in a black state.
Figure 3:
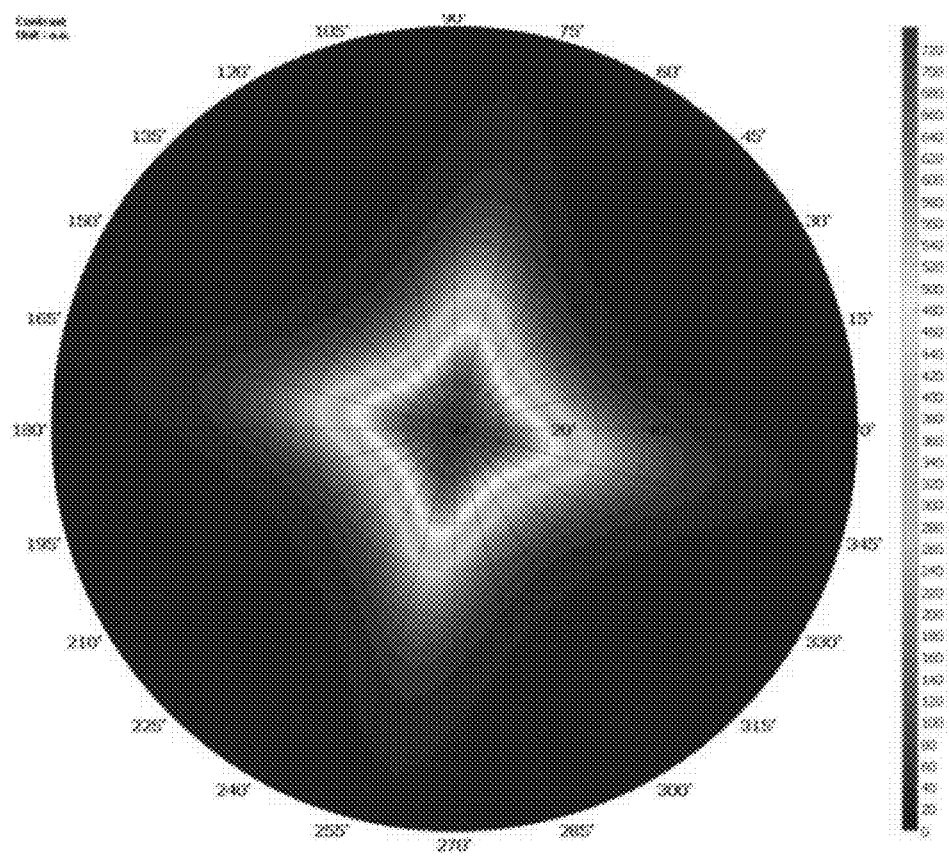
FIG. 3 is a simulation effect diagram of a contrast of the liquid crystal display panel shown in FIG. 1 at different visual angles.

FIG. 1 is a schematic diagram of a conventional liquid crystal display panel. As shown in FIG. 1, the liquid crystal display panel includes a first substrate 10'; a second substrate 20' opposite to the first substrate 10'; a liquid crystal layer 30' disposed between the first substrate 10' and the second substrate 20'; a first linear polarizer 41'; a second linear polarizer 42', where an absorption axis of the first linear polarizer 41' is orthogonal to an absorption axis of the second linear polarizer 42'; a first quarter-wave plate 11'; and a second quarter-wave plate 12'; where a slow axis of the first quarter-wave plate 11' is orthogonal to a slow axis of the second quarter-wave plate 12'. FIG. 2 is a simulation effect diagram of the liquid crystal display panel shown in FIG. 1 at different visual angles in a black state. FIG. 3 is a simulation effect diagram of a contrast of the liquid crystal display panel shown in FIG. 1 at different visual angles. It can be seen that the liquid crystal display panel has significant and substantial light leakage at a large visual angle in a black state, and the liquid crystal display panel has a very low contrast at a large visual angle and poor visual angle characteristics.

Figure 4:
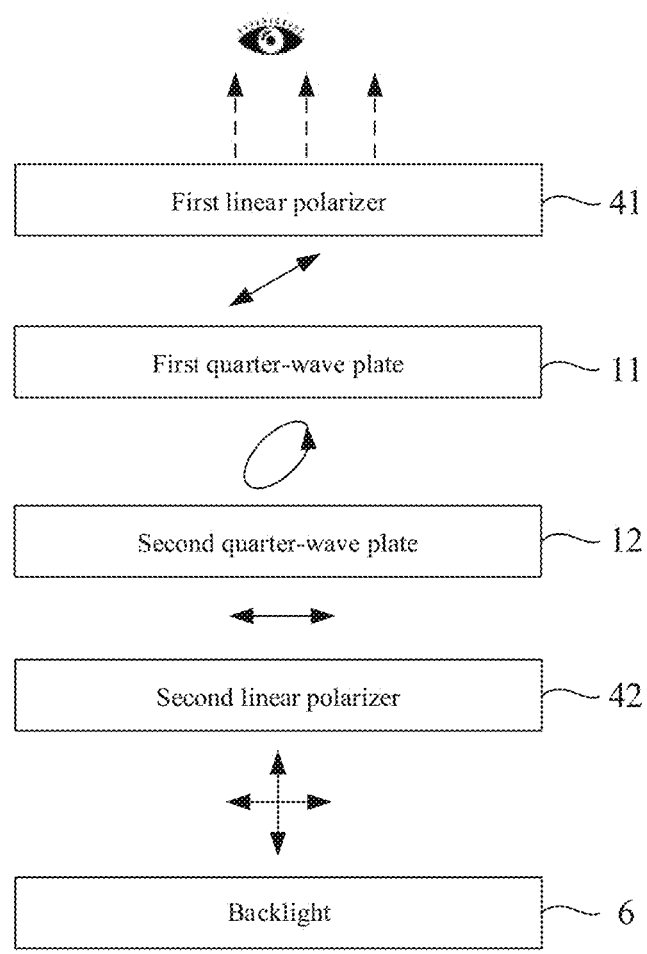
FIG. 4 is a schematic diagram of a light path of the liquid crystal display panel shown in FIG. 1 observed at a visual angle of (45°, 0°) in a black state.
Figure 5:
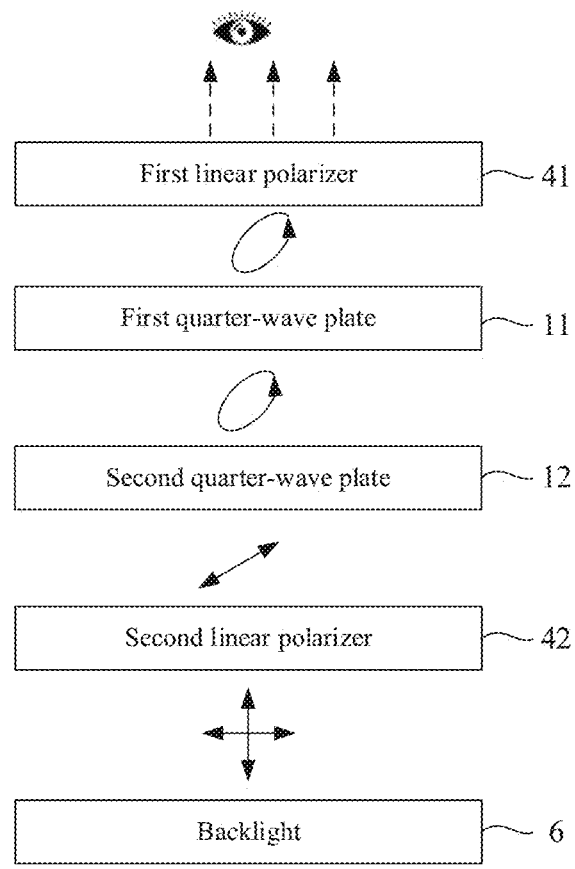
FIG. 5 is a schematic diagram of a light path of the liquid crystal display panel shown in FIG. 1 observed at a visual angle of (45°, 45°) in a black state.
Figure 6:
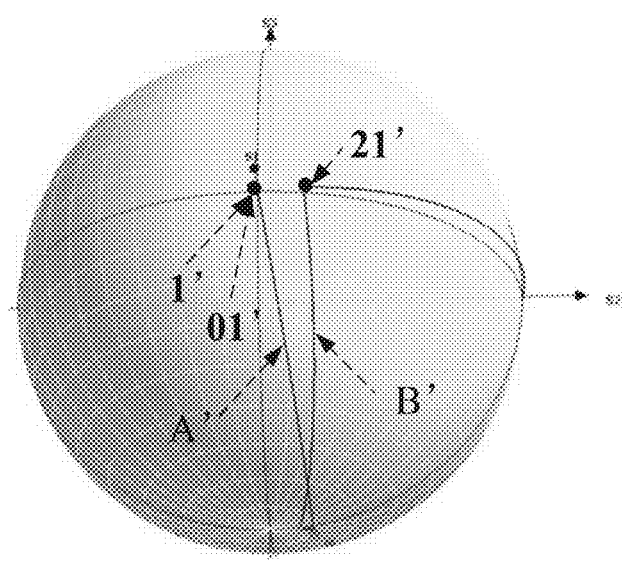
FIG. 6 is a diagram of a Poincaré sphere for the liquid crystal display panel shown in FIG. 1 observed at a visual angle of (45°, 0°) in a black state.
Figures 7, 8:
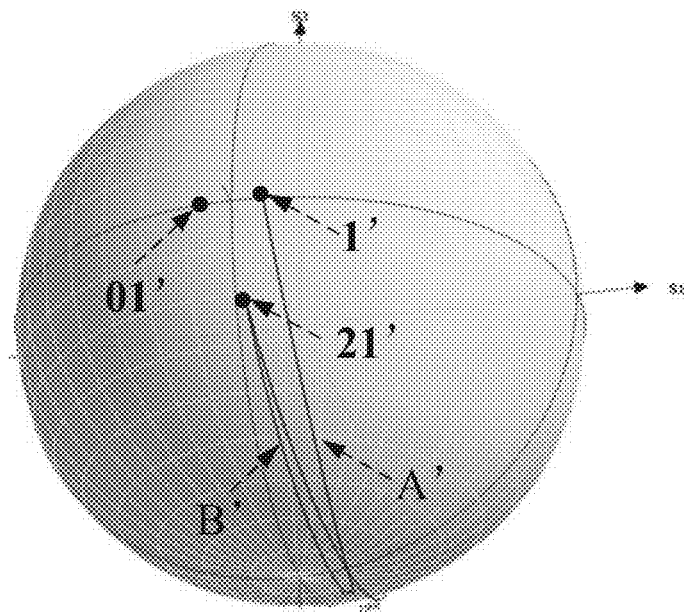
FIG. 7 is a diagram of a Poincaré sphere for the liquid crystal display panel shown in FIG. 1 observed at a visual angle of (45°, 45°) in a black state.
FIG. 8 is a schematic cross-sectional view of a liquid crystal display panel according to an embodiment of the present disclosure.

FIG. 4 is a schematic diagram of a light path of the liquid crystal display panel shown in FIG. 1 observed at a visual angle of (45°, 0°) in a black state. FIG. 5 is a schematic diagram of a light path of the liquid crystal display panel shown in FIG. 1 observed at a visual angle of (45°, 45°) in a black state. The analysis is carried out in combination with the Poincaré sphere that represents a polarization state of light, as shown in Table 1, Table 2, Table 3, FIG. 6, and FIG. 7. Table 1, Table 2, and Table 3 are schematic tables listing the Poincaré sphere coordinates at three different visual angles. Herein, the Poincaré sphere coordinates in Table 1 are obtained at a visual angle (0°, 0°), the Poincaré sphere coordinates in Table 2 are obtained at a visual angle (45°, 0°), and the Poincaré sphere coordinates in Table 3 are obtained at a visual angle (45°, 45°). FIG. 6 is a diagram of a Poincaré sphere for the liquid crystal display panel shown in FIG. 1 observed at a visual angle of (45°, 0°) in a black state. FIG. 7 is a diagram of a Poincaré sphere for the liquid crystal display panel shown in FIG. 1 observed at a visual angle of (45°, 45°) in a black state. In FIG. 6 and FIG. 7, a point 1' represents a polarization state of light emitted from the backlight 6' after passing through the second linear polarizer 42'. A curve A' represents a change trajectory of a polarization state of light passing through the second quarter-wave plate 12'. A curve B' represents a change trajectory of a polarization state of light passing through the first quarter-wave plate 11'. A point 21' represents a change of a polarization state of light emitted from the first quarter-wave plate 11'. A point 01' represents a polarization state of light that can be absorbed by the first linear polarizer 41', that is, a theoretically optimal point in a case of a black state and no light leakage. At the visual angle (45°, 0°), the slow axis of first quarter-wave plate 11' is no longer orthogonal to slow axis of the second quarter-wave plate 12'. At the visual angle (45°, 45°), a retardation of the first quarter-wave plate 11' is no longer equal to a retardation of the second quarter-wave plate 12'. Therefore, the point 1' shown in FIG. 6 and the point 1' shown in FIG. 7 have different coordinates, and the point 21' shown in FIG. 6 and the point 21' shown in FIG. 7 have different coordinates. Moreover, since an angle between the first linear polarizer 41' and the second linear polarizer 42' at the visual angle (45°, 0°) is not equal to that at the visual angle (45°, 45°), the point 01' shown in FIG. 6 and the point 01' shown in FIG. 7 have different coordinates.

TABLE 1

| Film layer | S1 coordinate | S2 coordinate | S3 coordinate |
| --- | --- | --- | --- |
| First quarter-wave plate | 0.9997 | −0.0226 | −0.0019 |
| Second quarter-wave plate | −0.0019 | 0.0175 | −0.9998 |
| Liquid crystal layer | 1.0000 | 0.0022 | −0.0019 |
| Second linear polarizer | 1.0000 | −0.0002 | 0.0000 |

TABLE 2

| Film layer | S1 coordinate | S2 coordinate | S3 coordinate |
| --- | --- | --- | --- |
| First quarter-wave plate | 0.9786 | 0.2048 | 0.0175 |
| Second quarter-wave plate | −0.0045 | 0.1333, | −0.9911 |
| Liquid crystal layer | 1.0000 | 0.0030 | 0.0017 |
| Second linear polarizer | 1.0000 | −0.0002 | 0.0000 |

TABLE 3

| Film layer | S1 coordinate | S2 coordinate | S3 coordinate |
| --- | --- | --- | --- |
| First quarter-wave plate | 0.0819 | −0.9309 | −0.3559 |
| Second quarter-wave plate | 0.1117 | 0.1878 | −0.9758 |
| Liquid crystal layer | 0.1252 | 0.1875 | −0.9743 |
| Second linear polarizer | 0.1158 | −0.9932 | −0.0108 |

A reference direction is defined as a direction of the absorption axis of the first linear polarizer as the visual angle (0°, 0°). Thus, at the visual angle (0°, 0°), an angle between the absorption axis of the first linear polarizer and the reference direction is 0°. The Poincaré sphere coordinates of the polarized light allowed to pass through the first linear polarizer can be denoted by (1.0000, −0.0002, 0.0000). It can be seen from Table 1 that at the visual angle (0°, 0°), light emitted from the first quarter-wave plate 11' is approximately linearly polarized light. A polarization direction of the linearly polarized light is approximately parallel to a direction of the absorption axis of the first linear polarizer 41'. Therefore, the linearly polarized light will be absorbed by the first linear polarizer 41'. Moreover, it can be seen from FIG. 2 and FIG. 3 that the liquid crystal display panel has a weak light leakage at a front visual angle (0°, 0°) in a black state, and a high contrast.

At the visual angle (45°, 0°), an angle between the absorption axis of the first linear polarizer and the reference direction is 0°. The Poincaré sphere coordinates of the polarized light allowed to pass through the first linear polarizer can be denoted by (1.0000, −0.0002, 0.0000). It can be seen from Table 2, FIG. 4, and FIG. 6 that at the visual angle (45°, 0°), light emitted from the first quarter-wave plate 11' is approximately linearly polarized light. However, a polarization direction of the linearly polarized light is not parallel to a direction of the absorption axis of the first linear polarizer 41'. The reason is that at the visual angle (45°, 0°), the slow axes of the first quarter-wave plate and the second quarter-wave plate are no longer perpendicular, which is expressed on the Poincaré sphere as causing polarized light emitted from the first quarter-wave plate 11' to be directed toward an S2 axis. That is, light emitted from the first quarter-wave plate 11' is approximately linearly polarized light of 45°, which cannot be completely absorbed by the first linear polarizer 41'. Moreover, it can be seen from FIG. 6 that a distance between the point 21' and the theoretically optimal point 01' is relatively large. Therefore, the liquid crystal display panel has a problem of light leakage at the visual angle (45°, 0°) in a black state, and has a low contrast.

At the visual angle (45°, 45°), an angle between the absorption axis of the first linear polarizer and the reference direction is 90°. The Poincaré sphere coordinates of the polarized light allowed to pass through the first linear polarizer can be denoted by (−0.1268, −0.9919, −0.0000). It can be seen from Table 3, FIG. 5, and FIG. 7 that at the visual angle (45°, 45°), light emitted from the first quarter-wave plate 11' is elliptically polarized light. The reason is that at the visual angle (45°, 45°), the retardations of the first quarter-wave plate and the second quarter-wave plate are no longer equal, which is expressed on the Poincaré sphere as causing polarized light emitted from the first quarter-wave plate 11' to have a component in a negative direction of S3 axis. That is, light emitted from the first quarter-wave plate 11' is approximately elliptically polarized light, which cannot be completely absorbed by the first linear polarizer 41' later. Moreover, in FIG. 7, a distance between point 21' and the theoretically optimal point 01' is relatively large. Therefore, the liquid crystal display panel has a problem of light leakage at the visual angle (45°, 45°) in a black state, and has a low contrast In combination with FIG. 2 and FIG. 3, it can be seen that the liquid crystal display panel with the structure shown in FIG. 1 has a low contrast and the significant and substantial problem of light leakage, at other visual angles such as a visual angle (45°, 135°), a visual angle (45°, 225°).

Based on this, a liquid crystal display panel is provided according to an embodiment of the present disclosure. FIG. 8 is a schematic cross-sectional view of a liquid crystal display panel according to an embodiment of the present disclosure. As shown in FIG. 8, the liquid crystal display panel includes a first substrate 10, a second substrate 20 opposite to the first substrate 10, and a liquid crystal layer 30 disposed between the first substrate 10 and the second substrate 20. In an example, the first substrate 10 may be a color filter substrate, which includes multiple color resists having different colors. The second substrate 20 may be an array substrate, which includes thin film transistors, pixel electrodes, and various signal lines such as scan lines and data lines.

In an example, the liquid crystal display panel provided by an embodiment of the present disclosure may adopt an In-Plane Switching (IPS) display mode. In this mode, the liquid crystal molecules are oriented and rotated in a plane parallel to the liquid crystal display panel. For example, the IPS display mode includes: a vertical domain structure and a horizontal domain structure. In the vertical domain structure, an orientation of the liquid crystals is parallel to a direction of the absorption axis of the second linear polarizer 42. In the horizontal domain structure, the orientation of the liquid crystals is parallel to a direction of the absorption axis of the first linear polarizer 41.

For example, FIG. 8 shows a schematic cross-sectional view of a liquid crystal display panel according to an embodiment of the present disclosure, when the vertical domain structure is adopted. In the vertical domain structure, the orientation of the liquid crystal layer is parallel to the direction of the absorption axis of the second linear polarizer. The liquid crystal display panel further includes a first linear polarizer 41, a second linear polarizer 42, a first quarter-wave plate 11, a second quarter-wave plate 12, and a first retardation film 51.

Herein, the first linear polarizer 41 is disposed at a side of the first substrate 10 facing away from the liquid crystal layer 30. The second linear polarizer 42 is disposed at a side of the second substrate 20 facing away from the liquid crystal layer 30. The absorption axis of the second linear polarizer 42 is perpendicular to the absorption axis of the first linear polarizer 41. In a process for subsequently arranging a backlight module including the backlight 6, the backlight module may be placed at a side of the second linear polarizer 42 facing away from the first linear polarizer 41.

In an embodiment of the present disclosure, the first quarter-wave plate 11 is disposed between the first substrate 10 and the first linear polarizer 41. An angle between the slow axis of the first quarter-wave plate 11 and the absorption axis of the first linear polarizer 41 is 45° or 135°.

In an embodiment of the present disclosure, a first retardation film 51 is provided between the first quarter-wave plate 11 and the second quarter-wave plate 12, and a second retardation film 52 is provided at a side of the first quarter-wave plate 11 facing away from the first retardation film 51, to alleviate the problem of light leakage of the liquid crystal display panel at a large visual angle in a black state and increase the contrast of the liquid crystal display panel at a large visual angle. Herein, the visual angle is represented by (θ, φ), θ represents an angle between a direction of the visual angle and the normal line of the liquid crystal display panel, and φ represents an angle between an orthographic projection of the direction of the visual angle in a plane of the liquid crystal display panel and a reference direction in the plane of the crystal display panel. The coordinates (0°, 0°) represents a front visual angle, and other visual angles are all large visual angles.

For example, FIG. 9 shows a schematic cross-sectional view of another liquid crystal display panel according to an embodiment of the present disclosure, when the horizontal domain structure is adopted. A difference from the structure shown in FIG. 8 is that, in FIG. 9, the orientation of the liquid crystal layer 30 is parallel to the direction of the absorption axis of the first linear polarizer 41. The second retardation film 52 is disposed between the second linear polarizer 42 and the liquid crystal layer 30. The arrangement of the second retardation film 52 can adjust the polarization state of light emitted from the second linear polarizer 42 to be parallel to the orientation of the liquid crystals.

When the horizontal domain structure is adopted, if the second retardation film 52 is not disposed between the second linear polarizer 42 and the liquid crystal layer 30, the retardation of the liquid crystal will change when a cell thickness fluctuates due to factors such as a production line process. To achieve the contract at the large visual angle, parameters of the above-mentioned first retardation film 51 are adjusted according to a box thickness of each liquid crystal display panel. The adjusting process is complicated and is not suitable for mass production. In an embodiment of the present disclosure, the second retardation film 52 is disposed between the second linear polarizer 42 and the liquid crystal layer 30. Thus, in a black state, that is, when the liquid crystal layer 30 is not powered up, the polarization state of light emitted from the second retardation film 52 and then passing through the liquid crystal layer 30 will not change. In this way, the final light output effect at a large visual angle will not be affected by the liquid crystals, eliminating an influence of the liquid crystals on light leakage in the black state. Thus, the parameter design for the first retardation film 51 can be applied to the liquid crystal display panels having different cell thicknesses. When the thickness of the liquid crystal cell fluctuates due to factors such as a production line process, the above-mentioned design can still be applied, thereby extending an application scope of the embodiments of the present disclosure.

For the liquid crystal display panel provided by an embodiment of the present disclosure, the problem of light leakage in the black state at a large visual angle can be compensated by the arrangement of the first retardation film 51. The above problem results from that the slow axis of the first quarter-wave plate 11 is no longer perpendicular to the slow axis of the second quarter-wave plate 12, or the retardation of the first quarter-wave plate 11 is no longer equal to the retardation of the first quarter-wave plate 12. Thus, a brightness of the liquid crystal display panel at a large visual angle in a black state can be reduced, thereby achieving a high contract of the liquid crystal display panel at a large visual angle and increasing a visual angle range of the liquid crystal display panel.

In addition, in an embodiment of the present disclosure, in the vertical domain structure, the second is provided at a side of the first quarter-wave plate 11 facing away from the first retardation film 51, so that the polarization state of light directed to the second linear polarizer 42 can be further adjusted to the direction of the absorption axis of the second linear polarizer 42, thereby further alleviating the problem of light leakage of the liquid crystal display panel at a large visual angle in the black state and increasing the contrast of the liquid crystal display panel at a large angle. In an embodiment of the present disclosure, in the horizontal domain structure, the second retardation film 52 is provided between the second linear polarizer 42 and the liquid crystal layer 30, thereby eliminating an influence of the liquid crystal layer on light leakage in the black state. The parameter design for the first retardation film 51 can be applied to liquid crystal display panel having different cell thicknesses. When the thickness of the liquid crystal cell fluctuates due to factors such as a production line process, the above-mentioned design can still be applied, thereby extending an application scope of the embodiments of the present disclosure.

In an example, the liquid crystal display panel according to the embodiments of the present disclosure can be applied to an on-board display screen, so as to increase a visual angle range of the on-board display screen.

In addition, the liquid crystal display panel inevitably includes a material with a high reflectivity, such as a shielding electrode having a shielding function. Alternatively, due to different reflectivity of different film layers, light may be reflected when passing through an interface between film layers of the liquid crystal display panel, such as between a substrate and a color filter, between a substrate and a black matrix, between a color filter and optical glue, or between a black matrix and optical glue. These film layers having a reflection function will reflect ambient light, and the reflected light will have an influence on emergent light of the liquid crystal display panel, thereby affecting the contrast of the liquid crystal display panel. In an embodiment of the present disclosure, the first quarter-wave plate 11 is provided between the first substrate 10 and the first linear polarizer 41, and the angle between the slow axis of the first quarter-wave plate 11 and the absorption axis of the first linear polarizer 41 is 45° or 135°, so that the incident ambient light may be changed into circularly polarized light by the first quarter-wave plate 11 and the first linear polarizer 41, thereby decreasing the reflectivity of the liquid crystal display panel.

In an embodiment of the present disclosure, as shown in FIG. 8, the second quarter-wave plate 12 is disposed between the liquid crystal layer 30 and the first substrate 10. That is, the second quarter-wave plate 12 is disposed in the liquid crystal cell. Taking an orientation shown in FIG. 8 as an example, the second quarter-wave plate 12 is disposed above the liquid crystal layer 30. That is, the first quarter-wave plate 11 and the second quarter-wave plate 12 are arranged at two sides of the above-mentioned film layer having reflection function. Thus, the incident ambient light incident onto the liquid crystal display panel is reflected before reaching the second quarter-wave plate 12, thereby preventing the incident ambient light incident onto the liquid crystal display panel from passing through the second quarter-wave plate 12 to cause an influence on the formation of the circularly polarized light.

It should be noted that a positional relationship of the various film layers shown in FIG. 8 is merely for illustration. In an embodiment of the present disclosure, the first retardation film 51 may be arranged between the first substrate 10 and the second quarter-wave plate 12. That is, the first retardation film 51 may be arranged in the liquid crystal cell. In this case, that the liquid crystal display panel can still have an extremely low reflectivity.

The following description illustrates an effect of the first retardation film 51 and the second retardation film 52 on increasing of the contrast at a large visual angle under the vertical domain structure and the horizontal domain structure, respectively.

Figure 10:
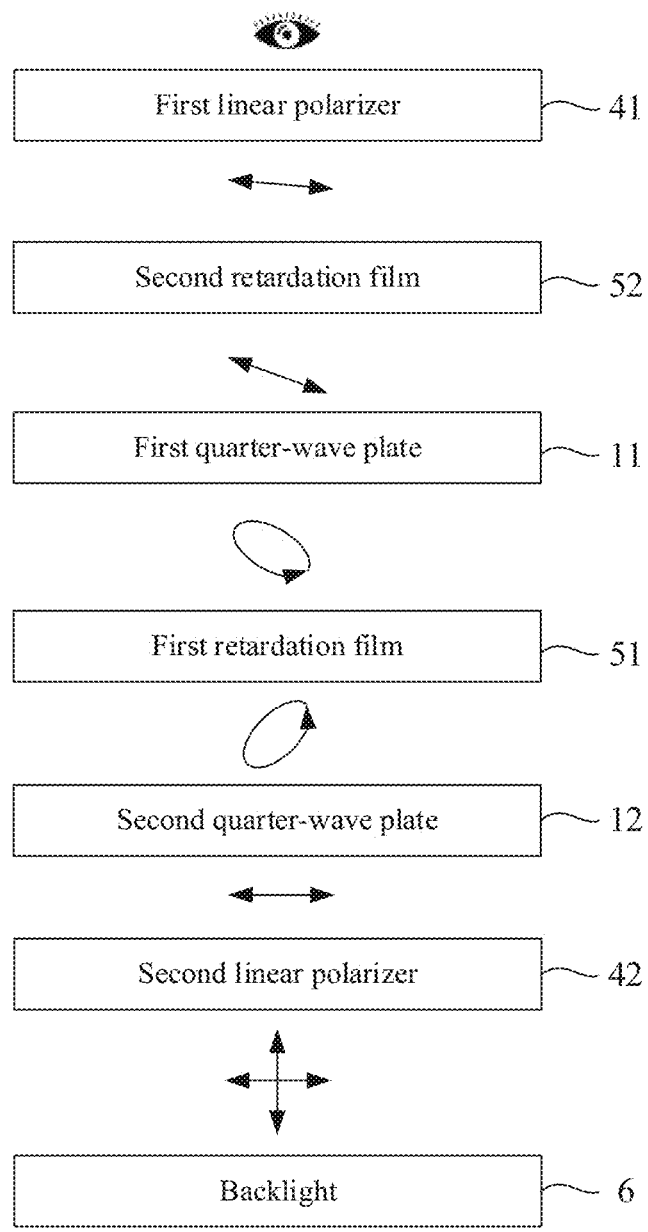
FIG. 10 is a schematic diagram of a light path of the liquid crystal display panel shown in FIG. 8 observed at a visual angle of (45°, 0°) in a black state, in accordance with an embodiment of the present disclosure.
Figure 11:
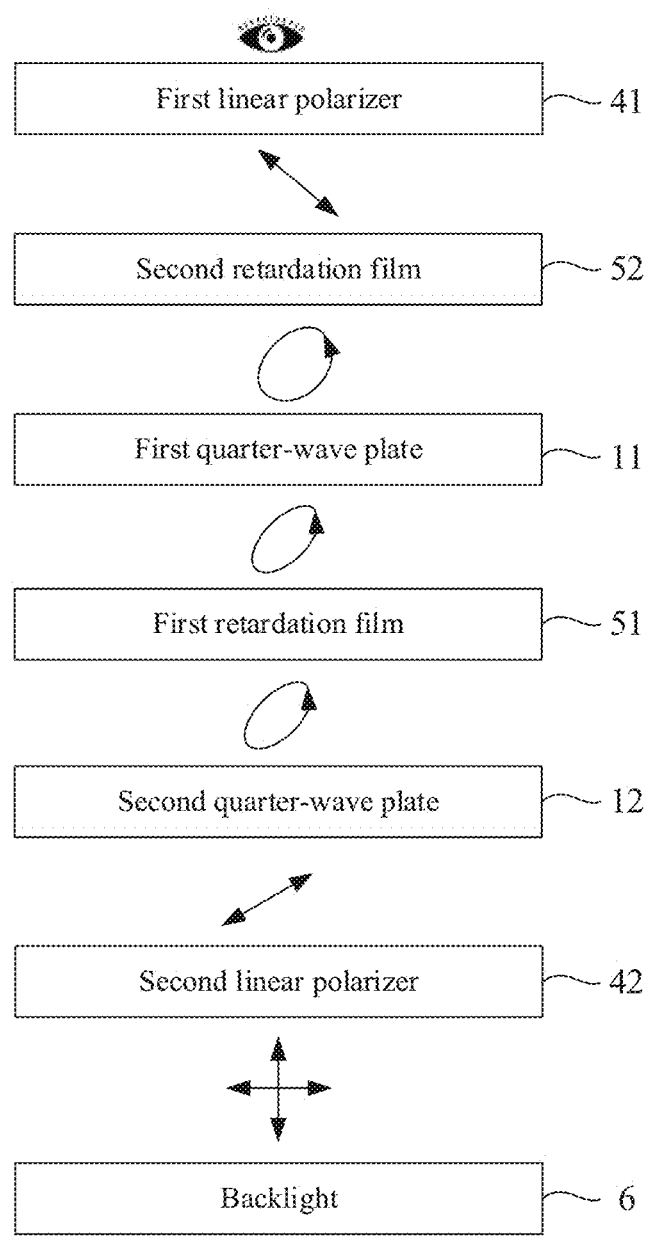
FIG. 11 is a schematic diagram of a light path of the liquid crystal display panel shown in FIG. 8 observed at a visual angle of (45°, 45°) in a black state, in accordance with an embodiment of the present disclosure.

In the case that the liquid crystal display panel is designed according to the vertical domain structure shown in FIG. 8, FIG. 10 shows a schematic diagram of a light path of the liquid crystal display panel shown in FIG. 8 observed at a visual angle of (45°, 0°) in a black state, and FIG. 11 shows a schematic diagram of a light path of the liquid crystal display panel shown in FIG. 8 observed at a visual angle of (45°, 45°) in a black state. As shown in FIG. 10 and FIG. 11, in combination with the Poincaré sphere representing the polarization state of light, the effect of the first retardation film 51 and the second retardation film 52 will be described with the visual angle (45°, 0°) and the visual angle (45°, 45°) as an example. In the Poincaré sphere, the polarization state of light can be represented by coordinates (S1, S2, S3) of a point on a sphere surface. Herein, S1 represents a coordinate of the point on an S1 axis, S2 represents a coordinate of the point on an S2 axis, and S3 represents a coordinate of the point on an S3 axis. On the Poincaré sphere, points on the equator represent that the polarization state of the light is linearly polarized light, that is, S3=0; points at two poles represent that the polarization state of the light is circularly polarized light, that is, S1=0 and S2=0; and the other points on the sphere surface represent that the polarization state of the light is elliptically polarized light.

Figure 12:
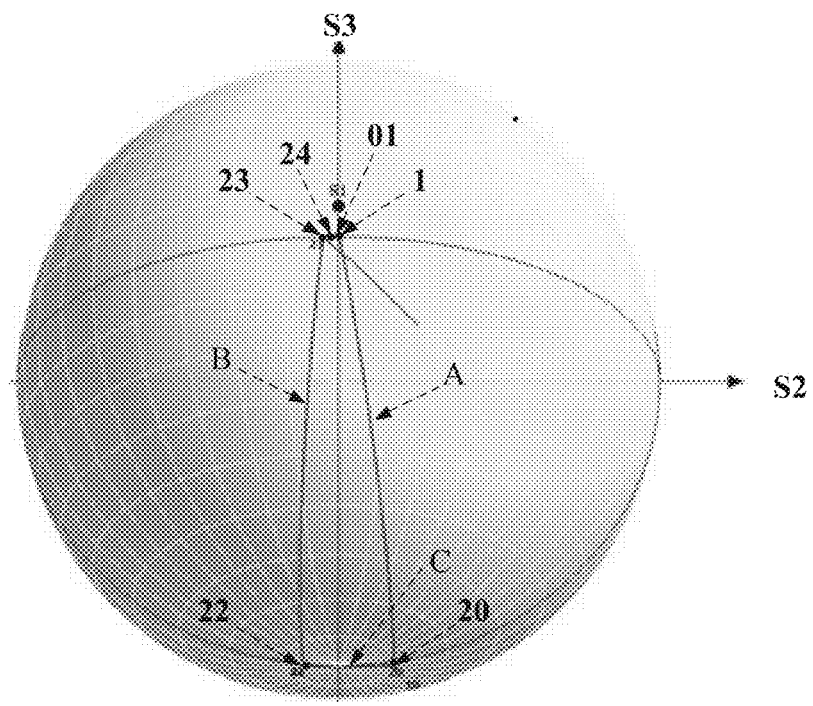
FIG. 12 is a diagram of a Poincaré sphere for the liquid crystal display panel shown in FIG. 8 observed at a visual angle of (45°, 0°) in a black state, in accordance with an embodiment of the present disclosure.
Figure 13:
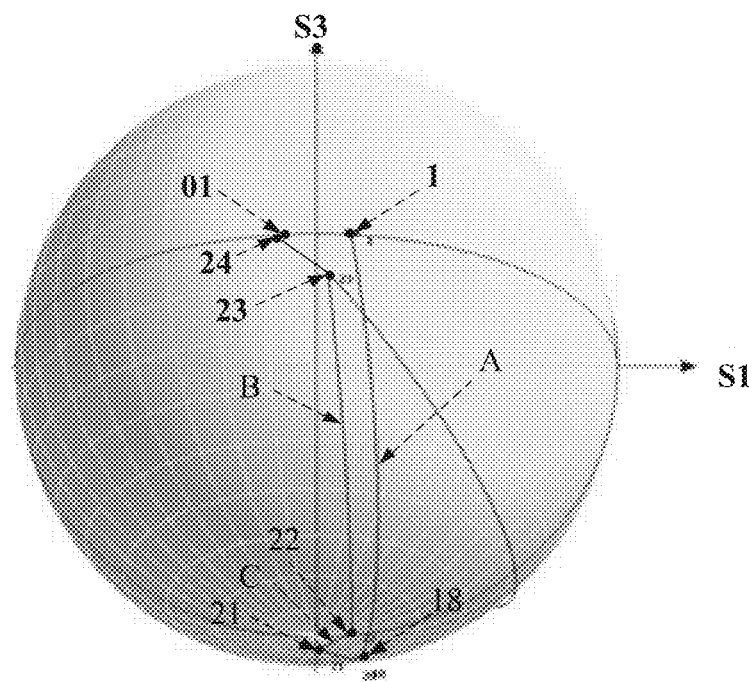
FIG. 13 is a diagram of a Poincaré sphere for the liquid crystal display panel shown in FIG. 8 observed at a visual angle of (45°, 45°) in a black state, in accordance with an embodiment of the present disclosure.

In the following, Table 4, Table 5, and Table 6 are schematic tables listing the Poincaré sphere coordinates at three different visual angles. Herein, the Poincaré sphere coordinates in Table 4 are obtained at a visual angle (0°, 0°), the Poincaré sphere coordinates in Table 5 are obtained at a visual angle (45°, 0°), and the Poincaré sphere coordinates in Table 6 are obtained at a visual angle (45°, 45°). FIG. 12 is a diagram of a Poincaré sphere for the liquid crystal display panel shown in FIG. 8 observed at a visual angle of (45°, 0°) in a black state. FIG. 13 is a diagram of a Poincaré sphere for the liquid crystal display panel shown in FIG. 8 observed at a visual angle of (45°, 45°) in a black state. As shown in FIG. 12 and FIG. 13, a point 1 represents the polarization state of light emitted from the backlight 6 after passing through the second linear polarizer 42. A curve A represents a change trajectory of the polarization state of light passing through the second quarter-wave plate 12. A curve B represents a change trajectory of the polarization state of light passing through the first quarter-wave plate 11. A curve C represents a change trajectory of the polarization state of light passing through the first retardation film 51. A point 23 represents the polarization state of light emitted from the first quarter-wave plate 11. A point 24 represents the polarization state of light emitted from the second retardation film 52. A point 01 represents the polarization state of light that can be absorbed by the first linear polarizer 41, that is, a theoretically optimal point.

TABLE 4

| Film layer | S1 coordinate | S2 coordinate | S3 coordinate |
|---|---|---|---|
| Second retardation film | 1.0000 | 0.0027 | 0.0031 |
| First quarter-wave plate | 0.9986 | 0.0534 | −0.0001 |
| First retardation film | −0.0001 | −0.0005 | −1.0000 |
| Second quarter-wave plate | −0.0001 | −0.0005 | −1.0000 |
| Liquid crystal layer | −0.0001 | 0.0481 | −0.9988 |
| Second linear polarizer | 1.0000 | −0.0018 | −0.0001 |

TABLE 5

| Film layer | S1 coordinate | S2 coordinate | S3 coordinate |
|---|---|---|---|
| Second retardation film | 0.9999 | −0.0112 | −0.0077 |
| First quarter-wave plate | 0.9991 | −0.0420 | −0.0028 |
| First retardation film | 0.0146 | 0.1258 | −0.9920 |
| Second quarter-wave plate | −0.0033 | 0.1784 | −0.9840 |
| Liquid crystal layer | 0.9999 | 0.0118 | 0.0063 |
| Second linear polarizer | 0.9999 | 0.0116 | 0.0062 |

TABLE 6

| Film layer | S1 coordinate | S2 coordinate | S3 coordinate |
|---|---|---|---|
| Second retardation film | −0.1835 | −0.9830 | 0.0080 |
| First quarter-wave plate | 0.0478 | −0.9896 | −0.1356 |
| First retardation film | 0.1146 | −0.0464 | −0.9923 |
| Second quarter-wave plate | 0.1206 | 0.1811 | −0.9760 |
| Liquid crystal layer | 0.1554 | 0.1803 | −0.9713 |
| Second linear polarizer | 0.1234 | −0.9923 | −0.0082 |

At the visual angle (0°, 0°), an angle between the absorption axis of the first linear polarizer 41 and the reference direction is 0°. The Poincaré sphere coordinates of the polarized light allowed to pass through the first linear polarizer can be denoted by (1.0000, 0.0000, 0.0000). It can be seen from Table 4 that at the visual angle (0°, 0°), the light directed to the first linear polarizer 41 may be approximately linearly polarized light by providing the first retardation film 51 and the second retardation film 52. The polarization direction of the linearly polarized light is approximately parallel to the direction of the absorption axis of the first linear polarizer 41. Therefore, the linearly polarized light will be absorbed by the first linear polarizer 41.

At the visual angle (45°, 0°), an angle between the absorption axis of the first linear polarizer 41 and the reference direction is 0°. The Poincaré sphere coordinates of the polarized light allowed to pass through the first linear polarizer can be denoted by (1.0000, 0.0000, 0.0000). It can be seen from Table 5, FIG. 10, and FIG. 12 that at the visual angle (45°, 0°), a change trajectory of the polarization state of light passing through the first quarter-wave plate 11 be approximately symmetrical to a change trajectory of the polarization state of light passing through the second quarter-wave plate 12 by providing the first retardation film 51, and the polarization state of light may be adjusted to be close to the direction of the absorption axis of the first linear polarizer 41 by providing the second retardation film 52, so that light emitted from the second retardation film 52 can be approximately linearly polarized light. The polarization direction of the linearly polarized light is approximately parallel to the direction of the absorption axis of the first linear polarizer 41. Therefore, the linearly polarized light will be absorbed by the first linear polarizer 41. That is, the problem of light leakage at the visual angle (45°, 0°) in a black state can be alleviated, and the contrast at the visual angle (45°, 0°) can be increased.

At the visual angle (45°, 45°), an angle between the absorption axis of the first linear polarizer 41 and the reference direction is 90°. The Poincaré sphere coordinates of the polarized light allowed to pass through the first linear polarizer can be denoted by (0.0000, −0.1000, 0.0000). It can be seen from Table 6, FIG. 11 and FIG. 13 that at the visual angle (45°, 45°), the arrangement of the first retardation film 51 can offset the influence caused by unequal retardations of the first quarter-wave plate and the second quarter-wave plate at the visual angle in the related technology, and can reduce a component of the polarization state of the emitted light in a negative direction of the S3 axis at this visual angle. The arrangement of the second retardation film 52 can reduce a component of the polarization state of the emitted light in a positive direction of the S1 at this visual angle, so that the light emitted from the second retardation film 52 is approximately linearly polarized light. The polarization direction of the linearly polarized light is approximately parallel to the direction of the absorption axis of the first linear polarizer 41. Therefore, the linearly polarized light will be absorbed by the first linear polarizer 41. That is, the problem of light leakage at the visual angle (45°, 45°) in a black state can be alleviated, and the contrast at the visual angle (45°, 45°) can be increased.

The above description takes the visual angle (45°, 0°) and the visual angle (45°, 45°) as an example to illustrate the functions of the first retardation film 51 and the second retardation film 52. In the case of high contrasts at these two visual angles, it can be expected that the contrasts at other visual angles are analogously high.

In an embodiment of the present disclosure, based on the liquid crystal display panel having the structure shown in FIG. 8, an in-plane retardation Re1 of the first retardation film 51 satisfies Re1=0, and an out-of-plane retardation Rth1 of the first retardation film 51 satisfies 54 nm≤Rth1≤126 nm; an in-plane retardation Re2 of the second retardation film 52 satisfies Re2=0, and an out-of-plane retardation Rth2 of the second retardation film 52 satisfies 211.2 nm≤Rth2≤492.8 nm. That is, the first retardation film 51 and the second retardation film 52 have no Re dimension in a horizontal direction. An angle between the slow axis of the second retardation film 52 and the absorption axis of the first linear polarizer 41 is 90°. In this case, the first retardation film 51 and the second retardation film 52 can be used to increase the contrast of the liquid crystal display panel at a large visual angle. In addition, a case that the first retardation film 51 and the second retardation film 52 change the polarization direction of the reflected ambient light is avoided. Thus, the liquid crystal display panel can still have extremely low reflectivity.

Figure 14:
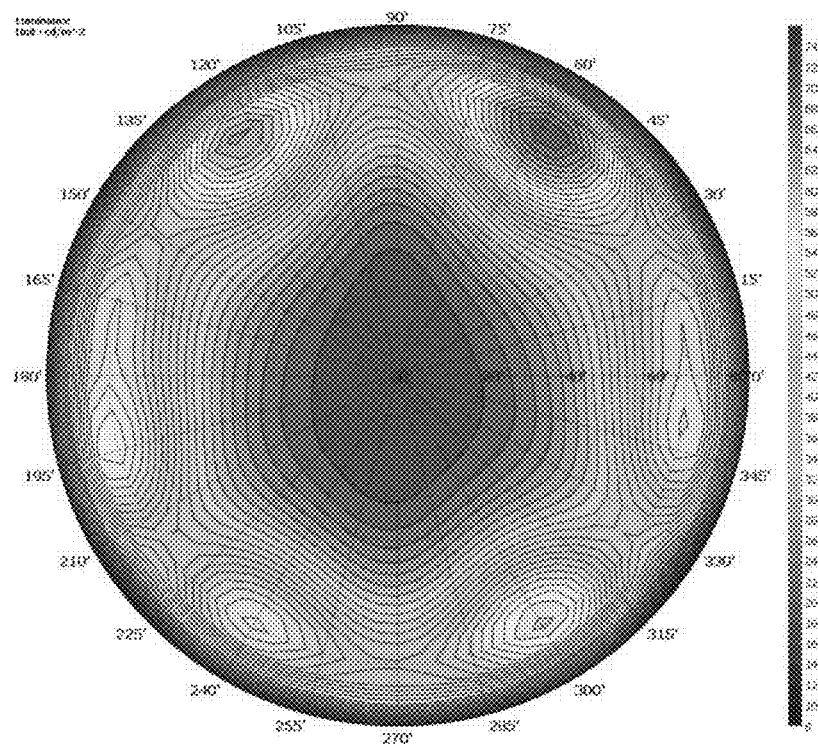
FIG. 14 is a simulation effect diagram of the liquid crystal display panel shown in FIG. 8 at different visual angles in a black state, in accordance with an embodiment of the present disclosure.
Figure 15:
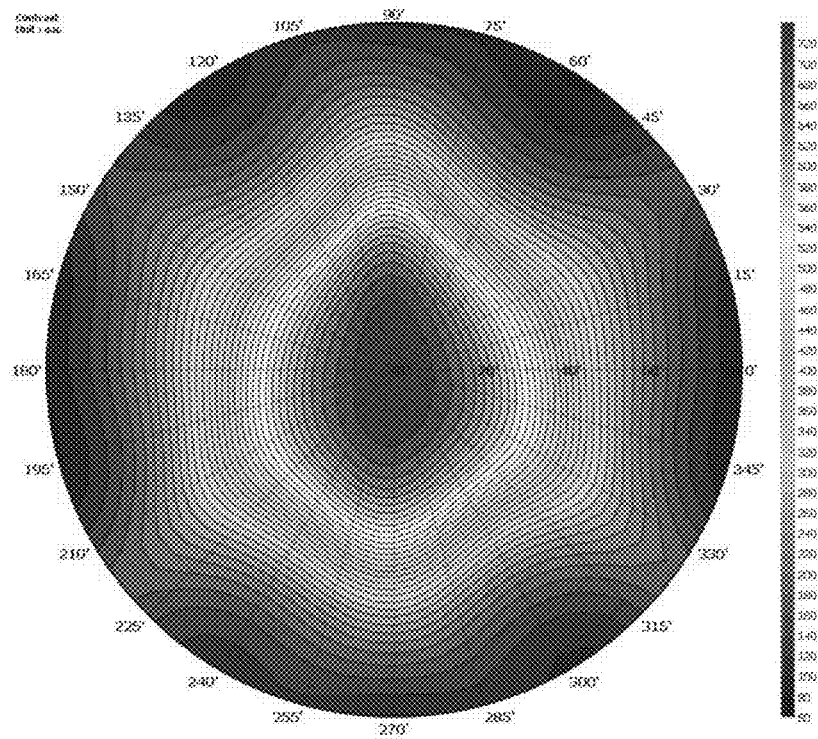
FIG. 15 is a simulation effect diagram of a contrast of a liquid crystal display panel shown in FIG. 8 at different visual angles, in accordance with an embodiment of the present disclosure.

In an embodiment of the present disclosure, the liquid crystal display panel is simulated, where the liquid crystal display panel has the structure shown in FIG. 8 and satisfies retardation characteristics Re1=0, Rth1=90 nm; and Re2=0, Rth2=352 nm. FIG. 14 is a simulation effect diagram of the liquid crystal display panel shown in FIG. 8 at different visual angles in a black state. FIG. 15 is a simulation effect diagram of a contrast of a liquid crystal display panel shown in FIG. 8 at different visual angles. Comparing with FIG. 2 and FIG. 3, it can be seen that a brightness at a large visual angle in a black state in FIG. 14 is lower than that in FIG. 2. Moreover, a visual angle range with a high contrast (light-color area) in FIG. 15 is significantly larger than that in FIG. 3. Moreover, comparing FIG. 3 and FIG. 15, it can be seen that at the same large visual angle, such as a visual angle (45°, 135°), the contrast in FIG. 15 is higher than that in FIG. 3. It means that the liquid crystal display panel based on the design shown in FIG. 8 can increase the contrast at the large visual angle. Moreover, it can be seen by comparing FIG. 3 and FIG. 15 that the configuration in this embodiment of the present disclosure can increase the contrast of the liquid crystal display panel at visual angles as a whole, while also correct distortion of a contrast diagram at the visual angles.

Figure 16:
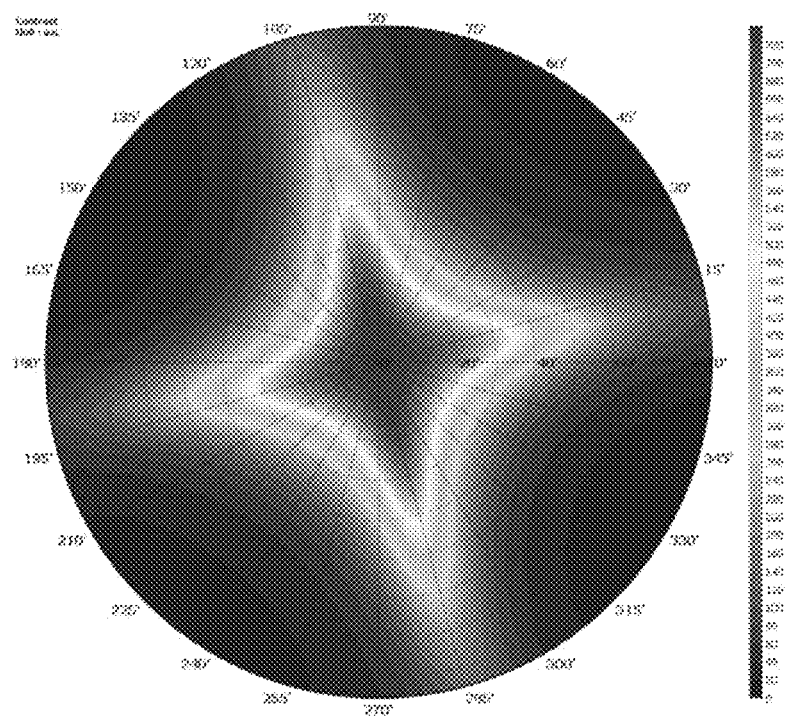
FIG. 16 is a simulation effect diagram of a contrast of another liquid crystal display panel shown in FIG. 8 at different visual angles, in accordance with an embodiment of the present disclosure.

In an embodiment of the present disclosure, the liquid crystal display panel is simulated, where the liquid crystal display panel has the structure shown in FIG. 8 and satisfies retardation characteristics Re1=0, Rth1=126 nm; and Re2=0, Rth2=492.8 nm. FIG. 16 is a simulation effect diagram of a contrast of another liquid crystal display panel shown in FIG. 8 at different visual angles. Comparing with FIG. 3, it can be seen that a visual angle range with a high contrast (light-color area) in FIG. 16 is significantly larger than that in FIG. 3. Moreover, it can be seen by comparing FIG. 3 and FIG. 16, that at the same large visual angle, such as a visual angle (45°, 135°), the contrast in FIG. 16 is higher than that in FIG. 3. This means that the liquid crystal display panel based on the design shown in FIG. 8 can have an increased contrast at a large visual angle.

Figure 17:
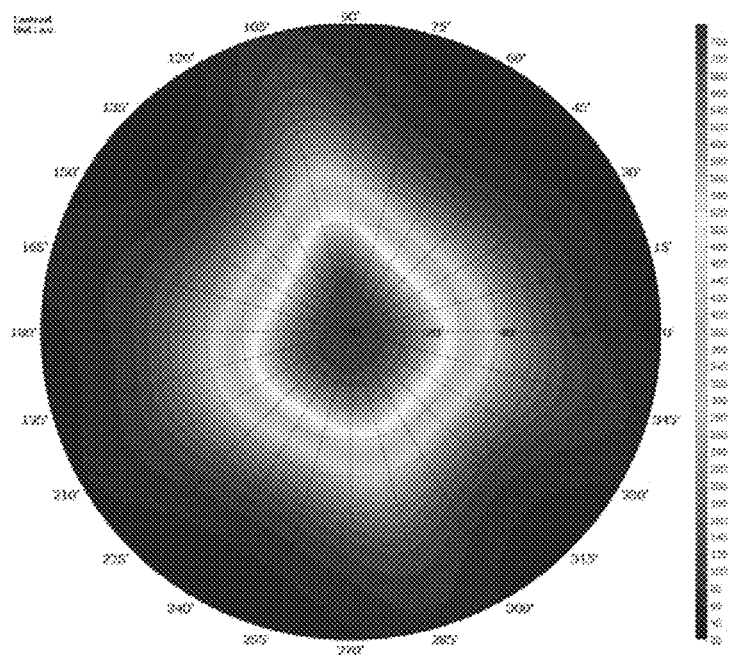
FIG. 17 is a simulation effect diagram of a contrast of still another liquid crystal display panel shown in FIG. 8 at different visual angles, in accordance with an embodiment of the present disclosure.

In an embodiment of the present disclosure, the liquid crystal display panel is simulated, where the liquid crystal display panel has the structure shown in FIG. 8 and satisfies retardation characteristics Re1=0, Rth1=126 nm; and Re2=0, Rth2=211.2 nm. FIG. 17 is a simulation effect diagram of a contrast of still another liquid crystal display panel shown in FIG. 8 at different visual angles. Comparing with FIG. 3, it can be seen that a visual angle range with a high contrast (light-color area) in FIG. 17 is significantly larger than that in FIG. 3. Moreover, considering a ratio k of the contrast at a cone angle of θ=45° to a contrast of the center, a value of k measured from FIG. 17 is twice as large as a value of k measured based on the structure of FIG. 1. Moreover, comparing FIG. 3 and FIG. 17, it can be seen that at the same large visual angle, such as a visual angle (40°, 105°), the contrast in FIG. 17 is higher than that in FIG. 3. This means that the liquid crystal display panel based on the design shown in FIG. 8 can have an increased contrast at a large visual angle.

Figure 18:
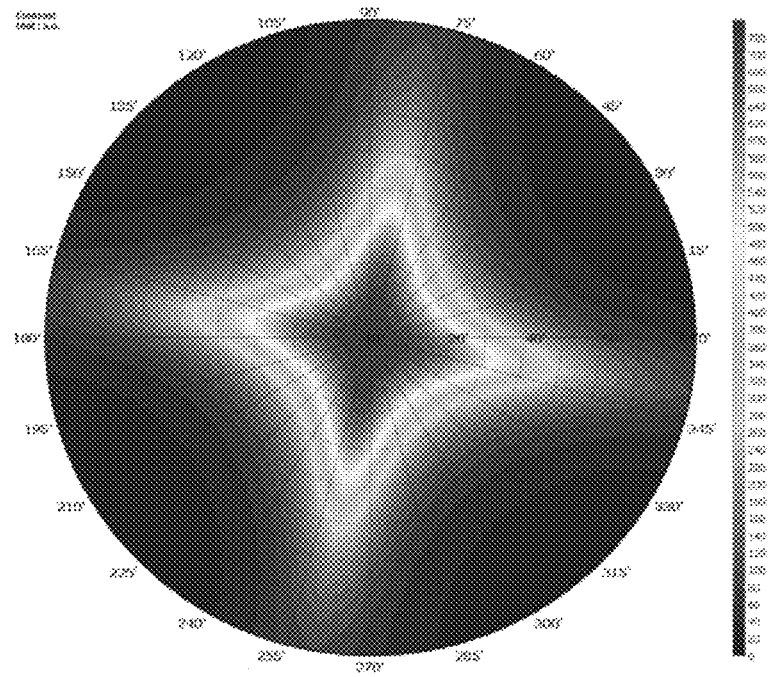
FIG. 18 is a simulation effect diagram of a contrast of still another liquid crystal display panel shown in FIG. 8 at different visual angles, in accordance with an embodiment of the present disclosure.

In an embodiment of the present disclosure, the liquid crystal display panel is simulated, where the liquid crystal display panel has the structure shown in FIG. 8 and satisfies retardation characteristics Re1=0, Rth1=54 nm; and Re2=0, Rth2=492.8 nm. FIG. 18 is a simulation effect diagram of a contrast of still another liquid crystal display panel shown in FIG. 8 at different visual angles. Comparing with FIG. 3, it can be seen that a visual angle range with a high contrast (light-color area) in FIG. 18 is significantly larger than that in FIG. 3. Moreover, considering a ratio k of the contrast at a cone angle of θ=45° to a contrast of the center, a value of k measured from FIG. 18 is twice as large as a value of k measured based on the structure of FIG. 1. This means that the liquid crystal display panel based on the design shown in FIG. 8 can have an increased contrast at a large visual angle.

Figure 19:
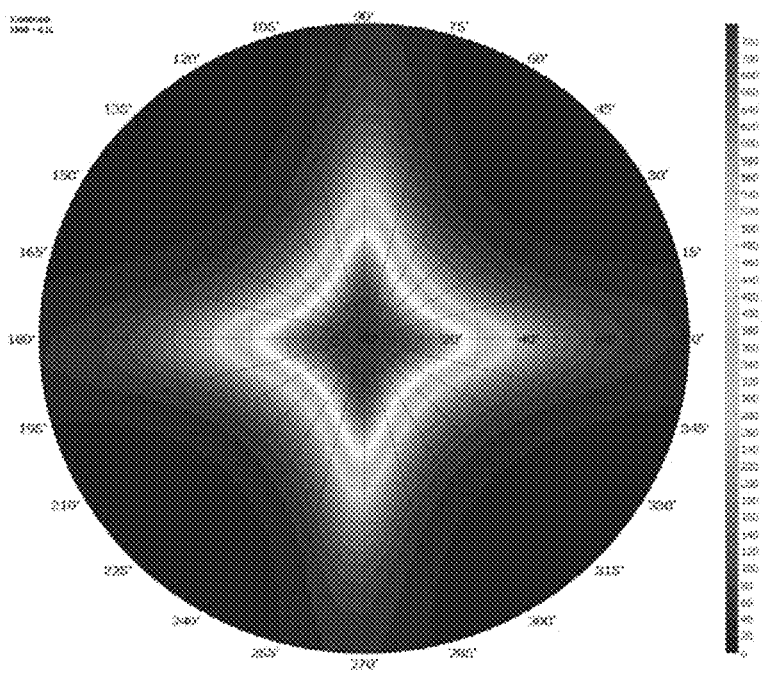
FIG. 19 is a simulation effect diagram of a contrast of still another liquid crystal display panel shown in FIG. 8 at different visual angles, in accordance with an embodiment of the present disclosure.

In an embodiment of the present disclosure, the liquid crystal display panel is simulated, where the liquid crystal display panel has the structure shown in FIG. 8 and satisfies retardation characteristics Re1=0, Rth1=54 nm; and Re2=0, Rth2=211.2 nm. FIG. 19 is a simulation effect diagram of a contrast of still another liquid crystal display panel shown in FIG. 8 at different visual angles. Comparing with FIG. 3, it can be seen that a visual angle range with a high contrast (light-color area) in FIG. 19 is significantly larger than that in FIG. 3. Moreover, considering a ratio k of the contrast at a cone angle of θ=45° to a contrast of the center, a value of k measured from FIG. 19 is twice as large as a value of k measured based on the structure of FIG. 1. This means that the liquid crystal display panel based on the design shown in FIG. 8 can have an increased contrast at a large visual angle.

In summary, based on the liquid crystal display panel having the structure shown in FIG. 8, in an embodiment of the present disclosure, the in-plane retardation Re1 of the first retardation film 51 satisfies Re1=0, and the out-of-plane retardation Rth1 of the first retardation film 51 satisfies 54 nm≤Rth1≤126 nm; and the in-plane retardation Re2 of the second retardation film 52 satisfies Re2=0, and the out-of-plane retardation Rth2 of the second retardation film 52 satisfies 211.2 nm≤Rth2≤492.8 nm. Within this range, the visual angle range of the liquid crystal display panel can be increased.

Alternatively, based on the liquid crystal display panel having the structure shown in FIG. 8, in an embodiment of the present disclosure, the in-plane retardation Re1 of the first retardation film 51 satisfies Re1=0 and the out-of-plane retardation Rth1 of the first retardation film 51 satisfies 54 nm≤Rth1≤126 nm; the in-plane retardation Re2 of the second retardation film 52 satisfies 121.2 nm≤Re2≤282.8 nm, and the out-of-plane retardation Rth2 of the second retardation film 52 satisfies Rth2=0; and an angle between the slow axis of the second retardation film 52 and the absorption axis of the first linear polarizer 41 is 0°. In this case, the visual angle range of the liquid crystal display panel can also be increased.

In an example, FIG. 20 shows a schematic cross-sectional view of still another liquid crystal display panel according to an embodiment of the present disclosure. As shown in FIG. 20, the liquid crystal display panel further includes a third retardation film 53 disposed between the second retardation film 52 and the first linear polarizer 41. The polarization state of the light emitted from the second retardation film 52 can further adjusted to be close to the direction of the absorption axis of the first linear polarizer 41 by disposing the third retardation film 53. Thus, the polarization direction of the linearly polarized light emitted from the third retardation film 53 is approximately parallel to the direction of the absorption axis of the first linear polarizer 41. In this way, the intensity of light emitted from the first linear polarizer 41 is small. Therefore, the contrast of the liquid crystal display panel is further increased at a large visual angle.

Figure 21:
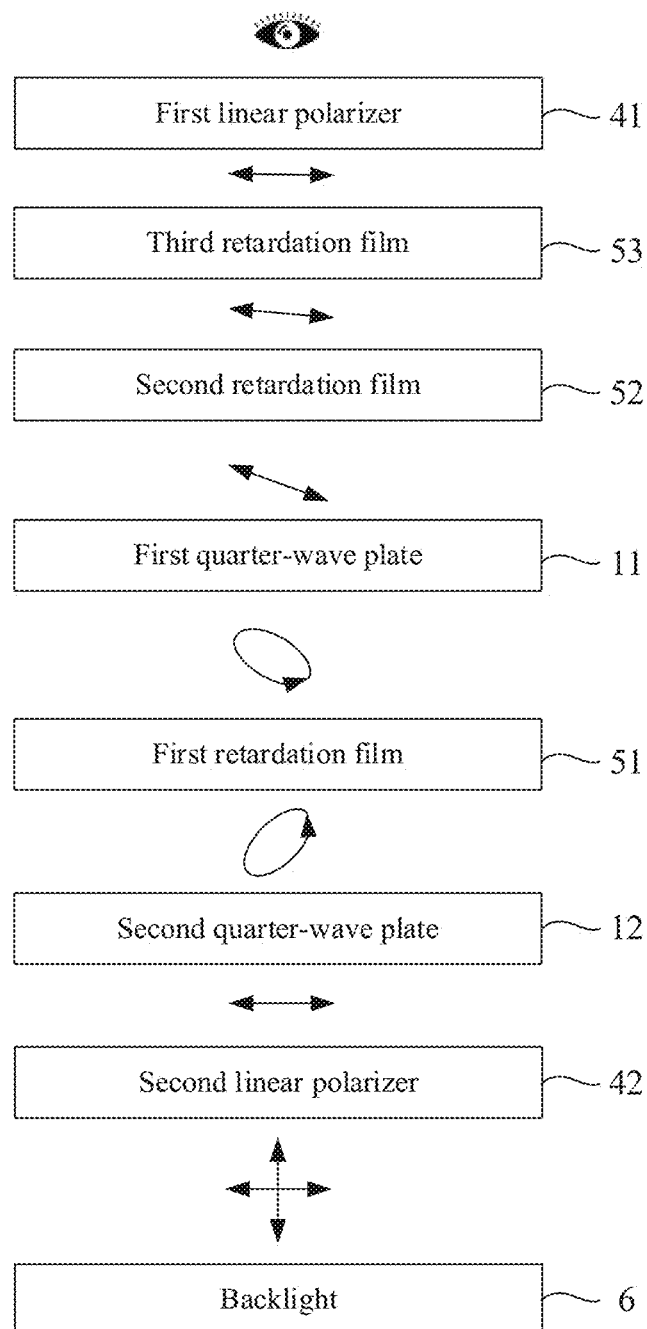
FIG. 21 is a schematic diagram of a light path of the liquid crystal display panel shown in FIG. 20 observed at a visual angle of (45°, 0°) in a black state, in accordance with an embodiment of the present disclosure.
Figure 22:
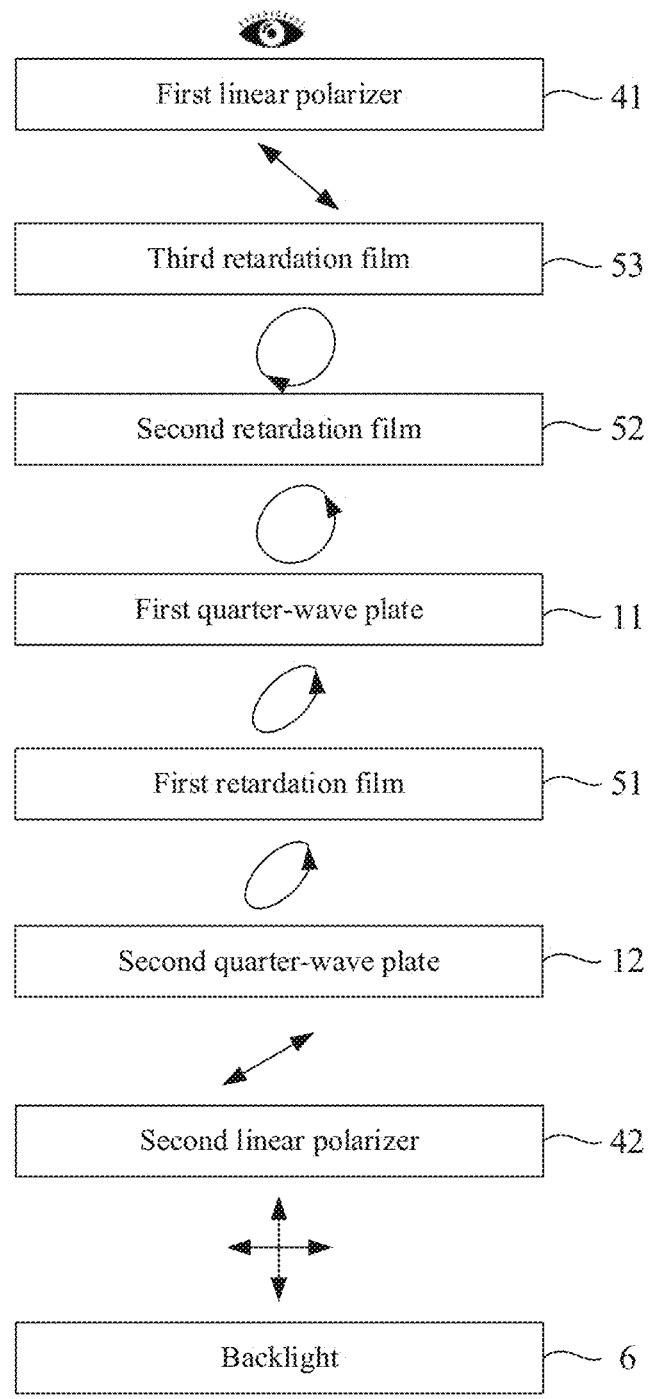
FIG. 22 is a schematic diagram of a light path of the liquid crystal display panel shown in FIG. 20 observed at a visual angle of (45°, 45°) in a black state, in accordance with an embodiment of the present disclosure.

FIG. 21 is a schematic diagram of a light path of the liquid crystal display panel shown in FIG. 20 observed at a visual angle of (45°, 0°) in a black state. FIG. 22 is a schematic diagram of a light path of the liquid crystal display panel shown in FIG. 20 observed at a visual angle of (45°, 45°) in a black state. As shown in FIG. 21 and FIG. 22, at the visual angle (45°, 0°), an angle between the absorption axis of the first linear polarizer 41 and the reference direction is 0°. The Poincaré sphere coordinates of the polarized light allowed to pass through the first linear polarizer 41 can be denoted by (1.0000, 0.0000, 0.0000). The polarization state of the light emitted from the second retardation film 52 can be adjusted to be close to the direction of the absorption axis of the first linear polarizer 41 by disposing the third retardation film 53. The polarization direction of the linearly polarized light emitted from the third retardation film 53 is approximately parallel to the direction of the absorption axis of the first linear polarizer 41. Therefore, the linearly polarized light will be absorbed by the first linear polarizer 41. That is, the problem of light leakage in a black state at the visual angle (45°, 0°) can be alleviated, and the contrast at the visual angle (45°, 0°) can be increased.

At the visual angle (45°, 45°), an angle between the absorption axis of the first linear polarizer 41 and the reference direction is 90°. The Poincaré sphere coordinates of the polarized light allowed to pass through the first linear polarized can be denoted by (0.0000, −0.9919, 0.0000). It can be seen from FIG. 22 that in a case where light emitted from the second retardation film 52 is elliptically polarized light, the arrangement of the third retardation film 53 can convert the elliptically polarized light into linearly polarized light, and can make the polarization direction of linearly polarized light emitted from the third retardation film 53 be approximately parallel to the direction of the absorption axis of the first linear polarizer 41. Therefore, the linearly polarized light will be absorbed by the first linear polarizer 41. That is, the problem of light leakage in the black state at the visual angle (45°, 45°) can be alleviated, and the contrast at the visual angle (45°, 45°) can be increased.

In an example, based on the liquid crystal display panel having the structure shown in FIG. 20, in an embodiment of the present disclosure, an in-plane retardation Re1 of the first retardation film 51 satisfies Re1=0, and an out-of-plane retardation Rth1 of the first retardation film 51 satisfies 54 nm≤Rth1≤126 nm; and an in-plane retardation Re2 of the second retardation film 52 satisfies 19.2 nm≤Re2≤44.8 nm, and an out-of-plane retardation Rth2 of the second retardation film 52 satisfies 84.24 nm≤Rth2≤196.56 nm. An angle between the slow axis of the second retardation film 52 and the absorption axis of the first linear polarizer 41 is 90°. In addition, an in-plane retardation Re3 of the third retardation film 53 satisfies 67.68 nm≤Re3≤157.92 nm, and an out-of-plane retardation Rth3 of the third retardation film 53 satisfies: −110.32 nm≤Rth3≤−47.28 nm. An angle between the slow axis of the third retardation film 53 and the absorption axis of the first linear polarizer 41 is 90°. In this embodiment of the present disclosure, the light leakage at various large visual angles in a black state can be alleviated by setting the retardations of the above-mentioned retardation films within the above-mentioned ranges. Thus, the display panel can have a large visual angle range and a high contrast at a front visual angle.

Figure 23:
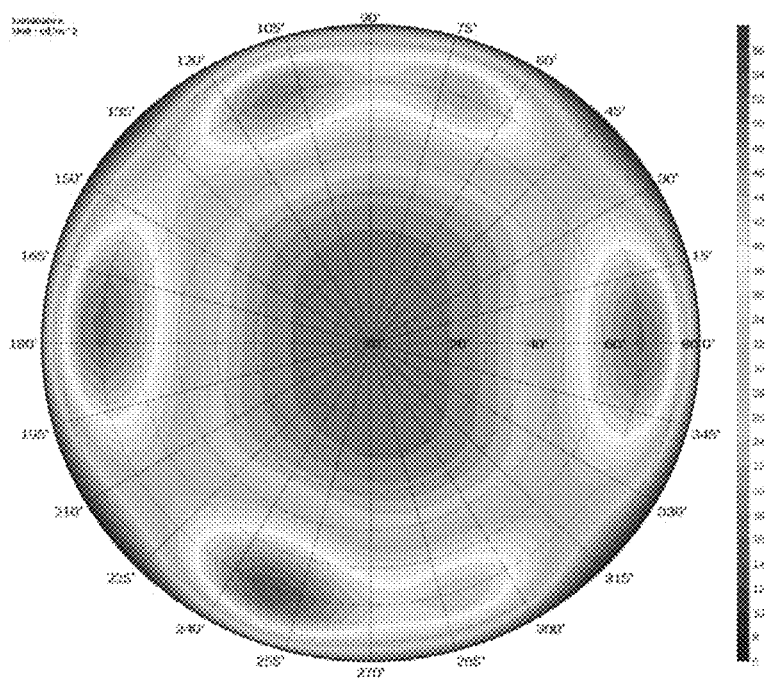
FIG. 23 is a simulation effect diagram of a liquid crystal display panel shown in FIG. 20 at different visual angles in a black state, in accordance with an embodiment of the present disclosure.
Figure 24:
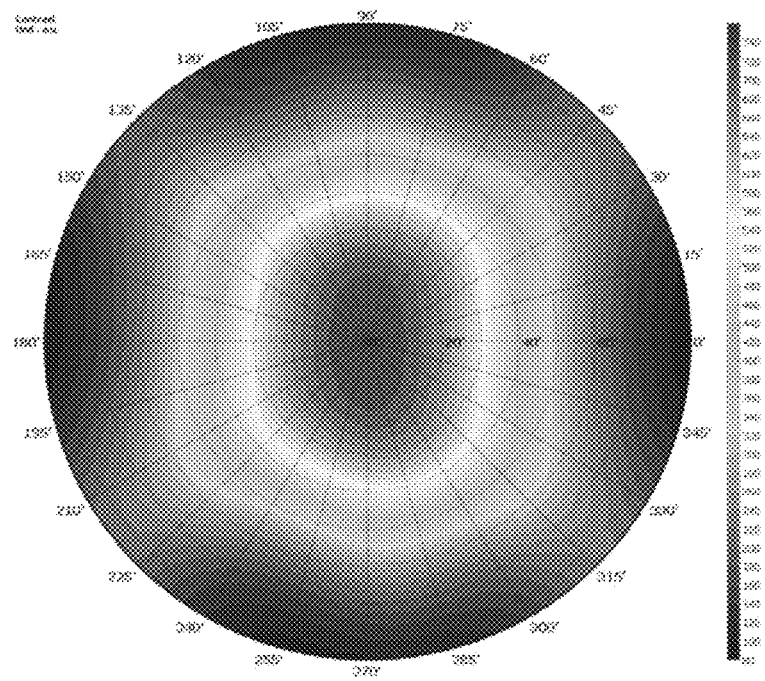
FIG. 24 is a simulation effect diagram of a contrast of a liquid crystal display panel shown in FIG. 20 at different visual angles, in accordance with an embodiment of the present disclosure.

In an embodiment of the present disclosure, the liquid crystal display panel is simulated, where the liquid crystal display panel has the structure shown in FIG. 20 and satisfies retardation characteristics Re1=0, Rth1=90.2 nm; Re2=32 nm, Rth2=140.4 nm; and Re3=112.8 nm, Rth3=−78.8 nm. FIG. 23 is a simulation effect diagram of a liquid crystal display panel shown in FIG. 20 at different visual angles in a black state. FIG. 24 is a simulation effect diagram of a contrast of a liquid crystal display panel shown in FIG. 20 at different visual angles. Comparing with FIG. 2 and FIG. 3, it can be seen that a brightness at a large visual angle in FIG. 24 is lower than that in FIG. 2, and a visual angle range with a high contrast (light-color area) in FIG. 24 is significantly larger than that in FIG. 3. Moreover, it can be seen by comparing FIG. 3 with FIG. 24 that at the same large visual angle, such as a visual angle (45°, 135°), the contrast in FIG. 24 is higher than that in FIG. 3. It means that the liquid crystal display panel based on the design shown in FIG. 20 can have an increased contrast at a large visual angle.

Alternatively, based on the liquid crystal display panel having the structure shown in FIG. 20, in an embodiment of the present disclosure, the in-plane retardation Re1 of the first retardation film 51 satisfies Re1=0, and the out-of-plane retardation Rth1 of the first retardation film 51 satisfies 54 nm≤Rth1≤126 nm; and the in-plane retardation Re2 of the second retardation film 52 satisfies 54.9 nm≤Re2≤128.1 nm, and the out-of-plane retardation Rth2 of the second retardation film 52 satisfies −58.52 nm≤Rth2≤−25.08 nm. An angle between the slow axis of the second retardation film 52 and the absorption axis of the first linear polarizer 41 is 0°. The in-plane retardation Re3 of the third retardation film 53 satisfies Re3=0, and the out-of-plane retardation Rth3 of the third retardation film 53 satisfies 63.6 nm≤Rth3≤148.4 nm. In this embodiment of the present disclosure, the light leakage at various large visual angles in a black state can be alleviated by setting the retardations of the above-mentioned retardation films within the above-mentioned ranges. Thus, the display panel can have a large visual angle range and a high contrast at a front visual angle.

Figure 25:
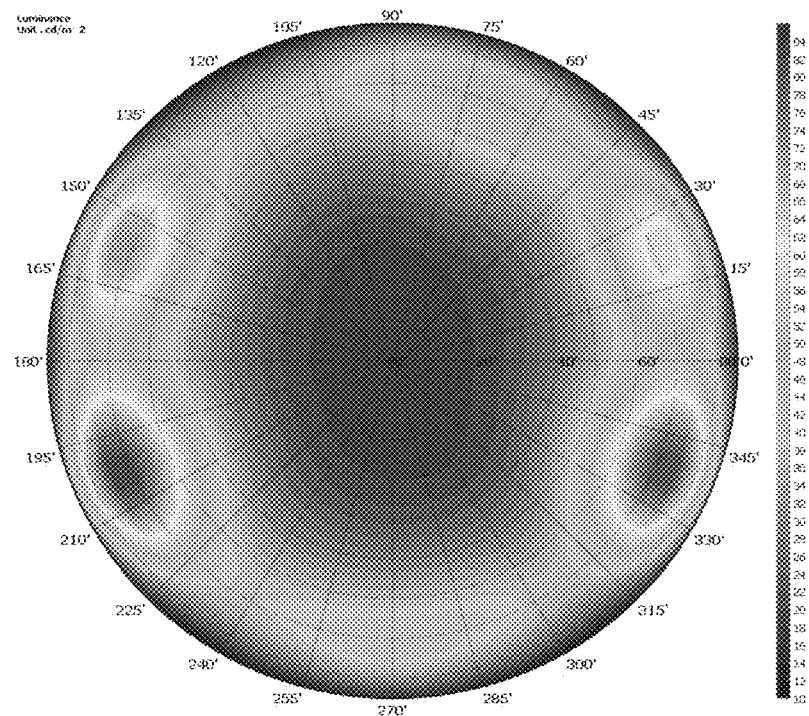
FIG. 25 is a simulation effect diagram of another liquid crystal display panel shown in FIG. 20 at different visual angles in a black state, in accordance with an embodiment of the present disclosure.
Figure 26:
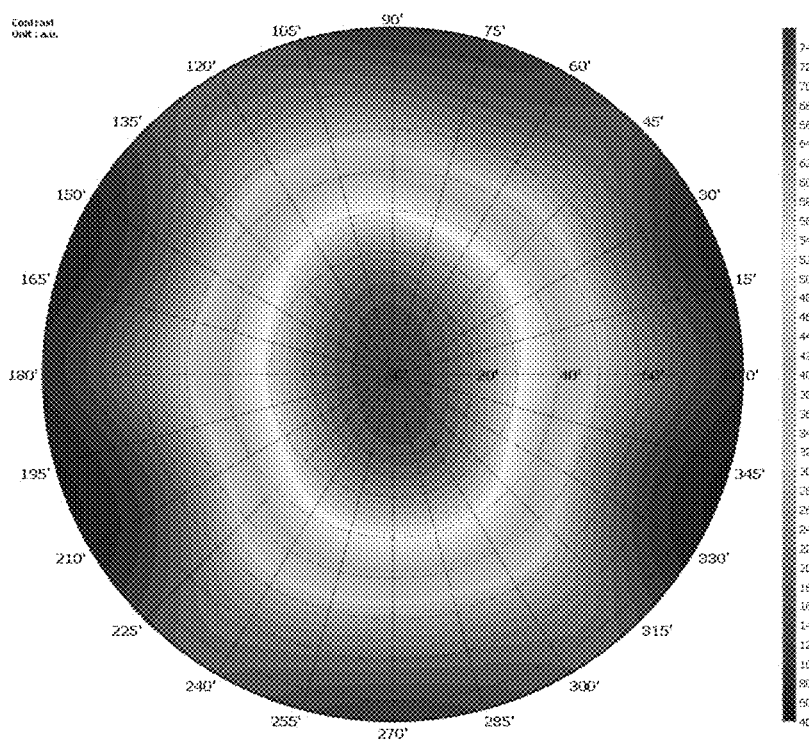
FIG. 26 is a simulation effect diagram of contrasts of another liquid crystal display panel shown in FIG. 20 at different visual angles, in accordance with an embodiment of the present disclosure.

In an embodiment of the present disclosure, the liquid crystal display panel is simulated, where the liquid crystal display panel has the structure shown in FIG. 20 and satisfies retardation characteristics Re1=0, Rth1=90.2 nm; Re2=91.5 nm, Rth2=−45.8 nm; and Re3=0 nm, Rth3=106 nm. FIG. 25 is a simulation effect diagram of another liquid crystal display panel shown in FIG. 20 at different visual angles in a black state. FIG. 26 is a simulation effect diagram of a contrast of another liquid crystal display panel shown in FIG. 20 at different visual angles. Comparing with FIG. 2 and FIG. 3, it can be seen that a brightness at a large visual angle in FIG. 25 is lower than that in FIG. 2, and a visual angle range with a high contrast (light-color area) in FIG. 26 is significantly larger than that in FIG. 3. Moreover, it can be seen by comparing FIG. 2 with FIG. 26 that at the same large visual angle, such as a visual angle (45°, 135°), the contrast in FIG. 26 is higher than that in FIG. 3. It means that the liquid crystal display panel based on the design shown in FIG. 20 can have an increased contrast at a large visual angle.

Figure 27:
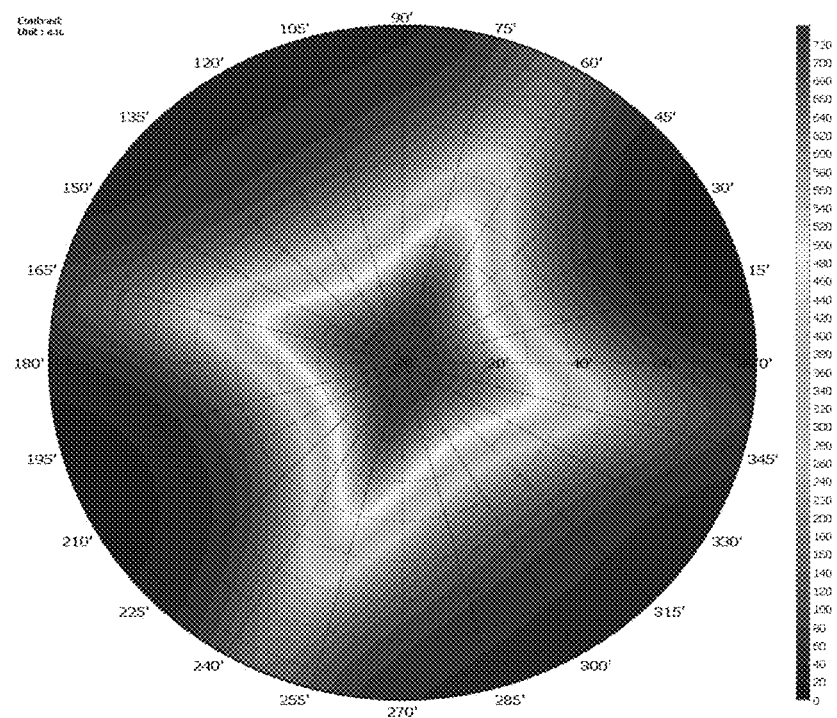
FIG. 27 is a simulation effect diagram of a contrast of still another liquid crystal display panel shown in FIG. 20 at different visual angles, in accordance with an embodiment of the present disclosure.

In an embodiment of the present disclosure, the liquid crystal display panel is simulated, where the liquid crystal display panel has the structure shown in FIG. 20 and satisfies retardation characteristics Re1=0, Rth1=126 nm; Re2=128.1 nm, Rth2=−25.08 nm; and Re3=0, Rth3=148.4 nm. FIG. 27 is a simulation effect diagram of a contrast of still another liquid crystal display panel shown in FIG. 20 at different visual angles. Comparing with FIG. 3, it can be seen that a visual angle range with a high contrast (light-color area) in FIG. 27 is significantly larger than that in FIG. 3. Moreover, considering a ratio k of a contrast at a cone angle of θ=45° to a contrast of the center, a value of k measured from FIG. 27 is twice as large as a value of k measured based on the structure of FIG. 1. Moreover, it can be seen by comparing FIG. 2 and FIG. 27 that at the same large visual angle, such as a visual angle (45°, 135°), the contrast in FIG. 27 is higher than that in FIG. 3. It means that the liquid crystal display panel based on the design shown in FIG. 20 can have an increased contrast at a large visual angle.

Figure 28:
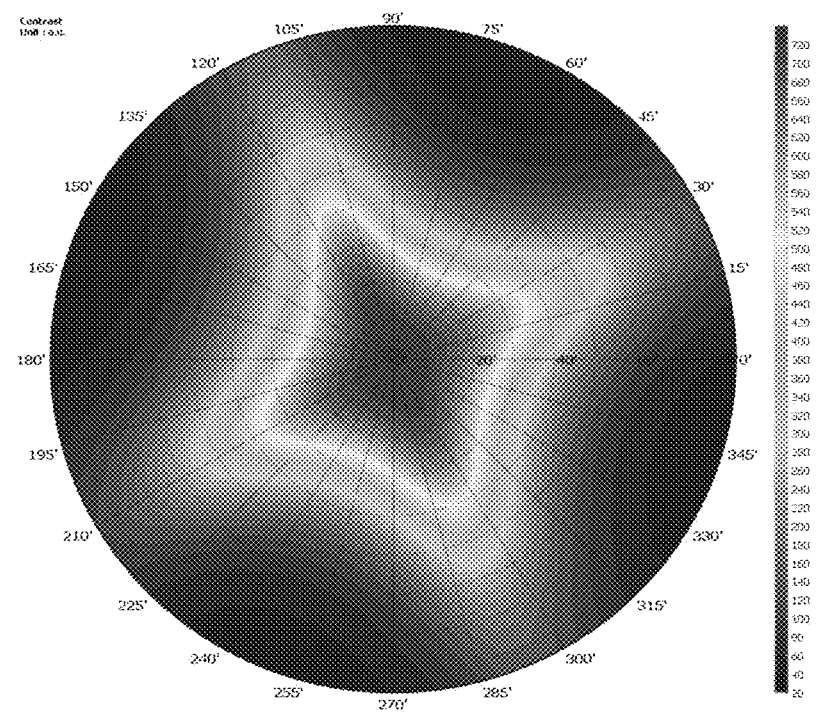
FIG. 28 is a simulation effect diagram of a contrast of still another liquid crystal display panel shown in FIG. 20 at different visual angles, in accordance with an embodiment of the present disclosure.

In an embodiment of the present disclosure, the liquid crystal display panel is simulated, where the liquid crystal display panel has the structure shown in FIG. 20 and satisfies retardation characteristics Re1=0, Rth1=126 nm; Re2=128.1 nm, Rth2=−25 0.08 nm; and Re3=0, Rth3=63 0.6 nm. FIG. 28 is a simulation effect diagram of a contrast of still another liquid crystal display panel shown in FIG. 20 at different visual angles. Comparing with FIG. 3, it can be seen that a visual angle range with a high contrast (light-color area) in FIG. 28 is significantly larger than that in FIG. 3. Moreover, considering a ratio k of a contrast at a cone angle of θ=45° to a contrast of the center, a value of k measured from FIG. 28 is twice as large as a value of k measured based on the structure of FIG. 1. Moreover, it can be seen by comparing FIG. 3 with FIG. 28 that at the same large visual angle, such as a visual angle (45°, 135°), the contrast in FIG. 28 is higher than that in FIG. 3. It means that the liquid crystal display panel based on the design shown in FIG. 20 can have an increased contrast at a large visual angle.

Figure 29:
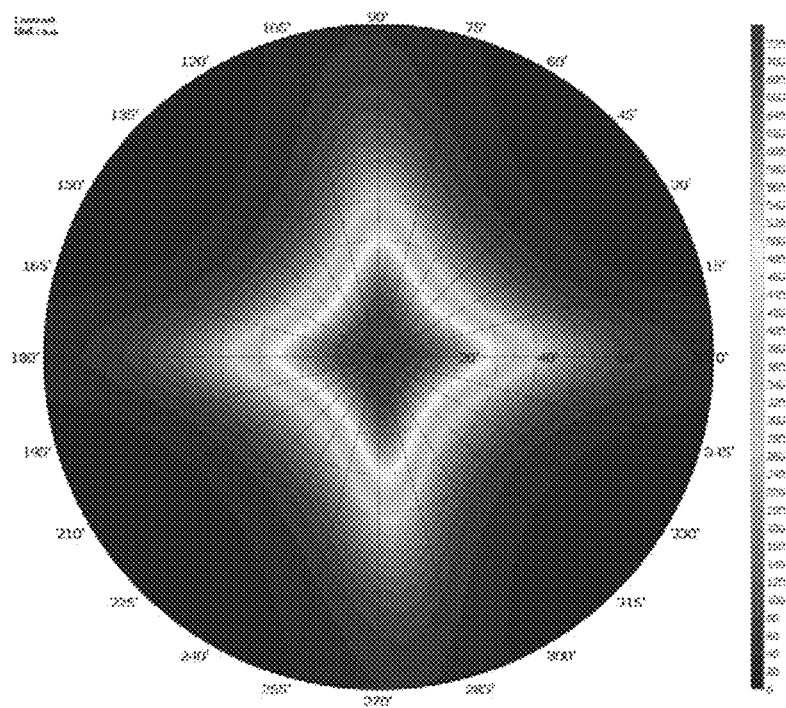
FIG. 29 is a simulation effect diagram of a contrast of still another liquid crystal display panel shown in FIG. 20 at different visual angles, in accordance with an embodiment of the present disclosure.

In an embodiment of the present disclosure, the liquid crystal display panel is simulated, where the liquid crystal display panel has the structure shown in FIG. 20 and satisfies retardation characteristics Re1=0, Rth1=126 nm; Re2=54.9 nm, Rth2=−58.52 nm; and Re3=0, Rth3=148.4 nm. FIG. 29 is a simulation effect diagram of a contrast of still another liquid crystal display panel shown in FIG. 20 at different visual angles. Comparing with FIG. 3, it can be seen that a visual angle range with a high contrast (light-color area) in FIG. 29 is significantly larger than that in FIG. 3. Moreover, considering a ratio k of a contrast at a cone angle of θ=45° to a contrast of the center, a value of k measured from FIG. 29 is twice as large as a value of k measured based on the structure of FIG. 1.

Figure 30:
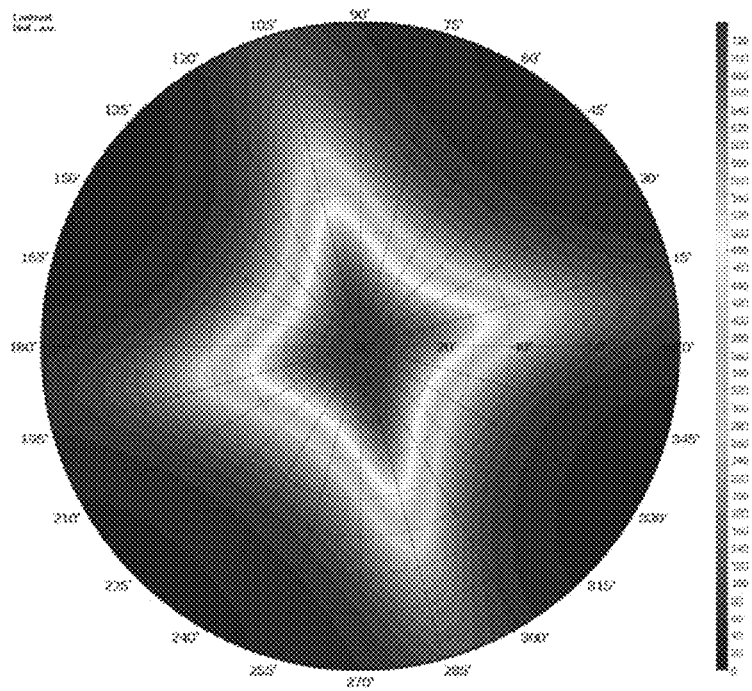
FIG. 30 is a simulation effect diagram of a contrast of still another liquid crystal display panel shown in FIG. 20 at different visual angles, in accordance with an embodiment of the present disclosure.

In an embodiment of the present disclosure, the liquid crystal display panel is simulated, where the liquid crystal display panel has the structure shown in FIG. 20 and satisfies retardation characteristics Re1=0, Rth1=126 nm; Re2=54.9 nm, Rth2=−58.52 nm; and Re3=0, Rth3=63.6 nm. FIG. 30 is a simulation effect diagram of a contrast of still another liquid crystal display panel shown in FIG. 20 at different visual angles. Comparing with FIG. 3, it can be seen that a visual angle range with a high contrast (light-color area) in FIG. 30 is significantly larger than that in FIG. 3. Moreover, considering a ratio k of a contrast at a cone angle of θ=45° to a contrast of the center, a value of k measured from FIG. 30 is twice as large as a value of k measured based on the structure of FIG. 1. This means that the liquid crystal display panel based on the design shown in FIG. 20 can have an increased contrast at a large visual angle.

Figure 31:
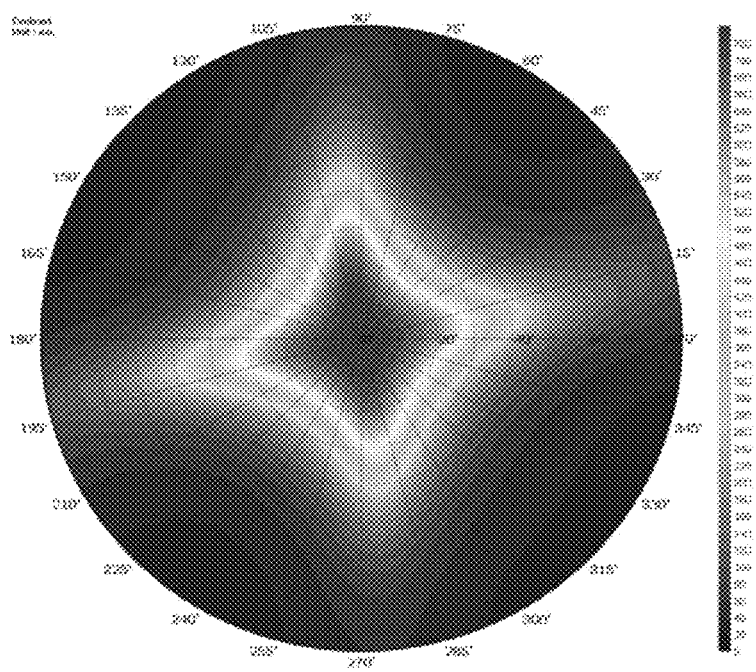
FIG. 31 is a simulation effect diagram of a contrast of still another liquid crystal display panel shown in FIG. 20 at different visual angles, in accordance with an embodiment of the present disclosure.

In an embodiment of the present disclosure, the liquid crystal display panel is simulated, where the liquid crystal display panel has the structure shown in FIG. 20 and satisfies retardation characteristics Re1=0, Rth1=54 nm; Re2=128.1 nm, Rth2=−25.08 nm; and Re3=0, Rth3=148.4 nm. FIG. 31 is a simulation effect diagram of a contrast of still another liquid crystal display panel shown in FIG. 20 at different visual angles. Comparing with FIG. 3, it can be seen that a visual angle range with a high contrast (light-color area) in FIG. 31 is significantly larger than that in FIG. 3. Moreover, considering a ratio k of a contrast at a cone angle of θ=45° to a contrast of the center, a value of k measured from FIG. 31 is twice as large as a value of k measured based on the structure of FIG. 1. This means that the liquid crystal display panel based on the design shown in FIG. 20 can have an increased contrast at a large visual angle.

Figure 32:
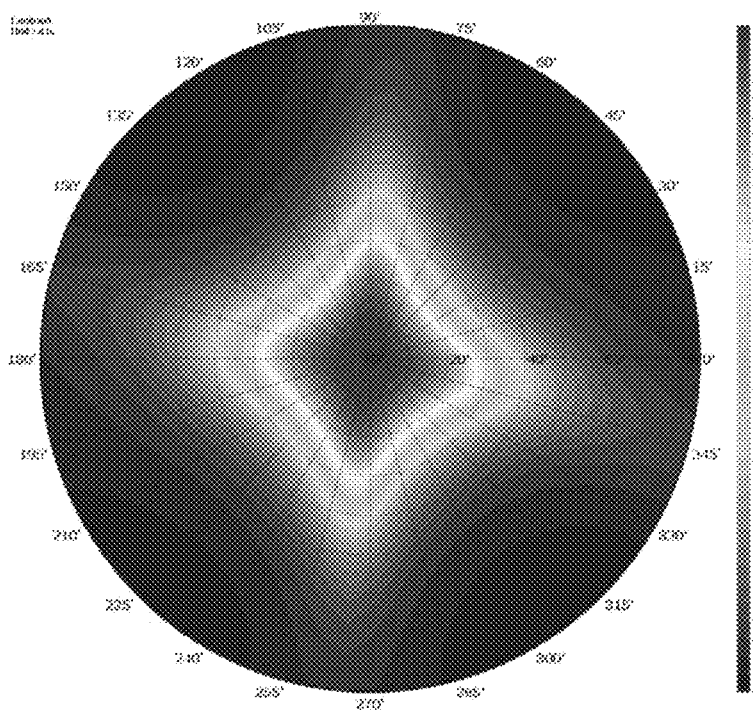
FIG. 32 is a simulation effect diagram of a contrast of still another liquid crystal display panel shown in FIG. 20 at different visual angles, in accordance with an embodiment of the present disclosure.

In an embodiment of the present disclosure, the liquid crystal display panel is simulated, where the liquid crystal display panel has the structure shown in FIG. 20 and satisfies retardation characteristics Re1=0, Rth1=54 nm; Re2=128.1 nm, Rth2=−25.08 nm; and Re3=0, Rth3=63.6 nm. FIG. 32 is a simulation effect diagram of a contrast of still another liquid crystal display panel shown in FIG. 20 at different visual angles. Comparing with FIG. 3, it can be seen that a visual angle range with a high contrast (light-color area) in FIG. 32 is significantly larger than that in FIG. 3. Moreover, considering a ratio k of a contrast at a cone angle of θ=45° to a contrast of the center, a value of k in FIG. 32 is twice as large as a value of based on the structure of FIG. 1. This means that the liquid crystal display panel based on the design shown in FIG. 20 can have an increased contrast at a large visual angle.

Figure 33:
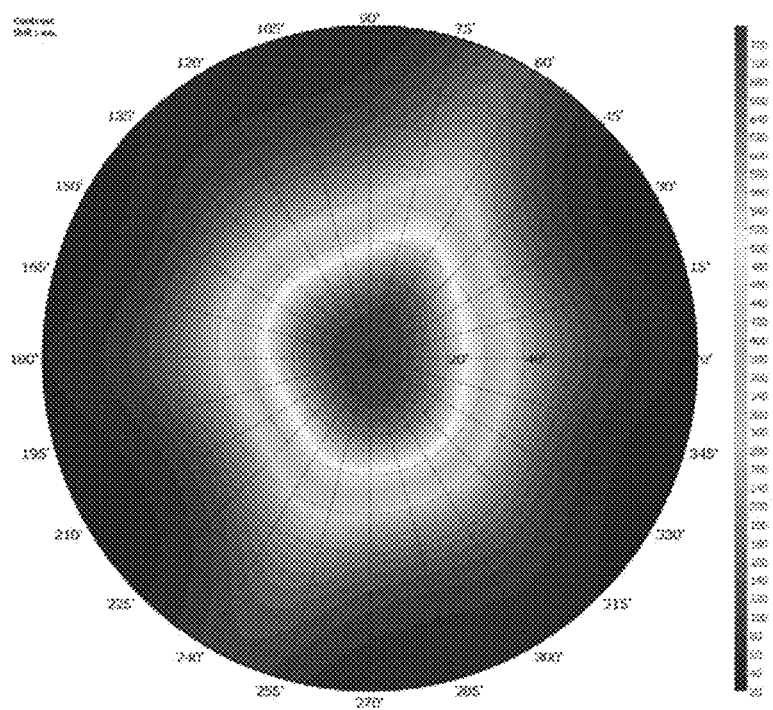
FIG. 33 is a simulation effect diagram of a contrast of still another liquid crystal display panel shown in FIG. 20 at different visual angles, in accordance with an embodiment of the present disclosure.

In an embodiment of the present disclosure, the liquid crystal display panel is simulated, where the liquid crystal display panel has the structure shown in FIG. 20 and satisfies retardation characteristics Re1=0, Rth1=54 nm; Re2=54.9 nm, Rth2=−58.52 nm; and Re3=0, Rth3=148.4 nm. FIG. 33 is a simulation effect diagram of a contrast of still another liquid crystal display panel shown in FIG. 20 at different visual angles. Comparing with FIG. 3, it can be seen that a visual angle range with a high contrast (light-color area) in FIG. 33 is significantly larger than that in FIG. 2. Moreover, considering a ratio k of a contrast at a cone angle of θ=45° to a contrast of the center, a value of k measured from FIG. 33 is twice as large as a value of k measured based on the structure of FIG. 1. Moreover, it can be seen by comparing FIG. 2 with FIG. 33 that at the same large visual angle, such as a visual angle (45°, 135°), the contrast in FIG. 33 is higher than that in FIG. 3. This means that the liquid crystal display panel based on the design shown in FIG. 20 can have an increased contrast at a large visual angle.

Figure 34:
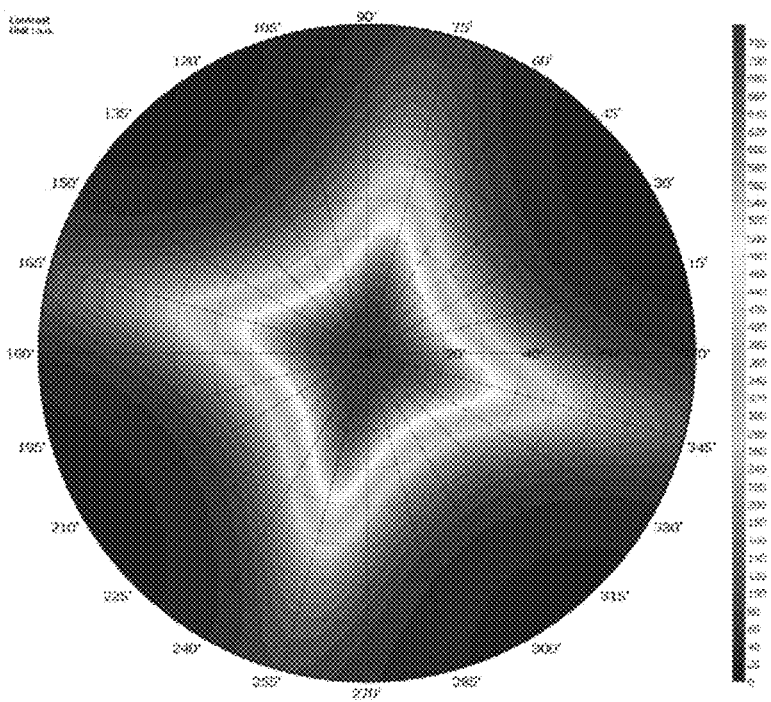
FIG. 34 is a simulation effect diagram of a contrast of still another liquid crystal display panel shown in FIG. 20 at different visual angle, in accordance with an embodiment of the present disclosure s.

In an embodiment of the present disclosure, the liquid crystal display panel is simulated, where the liquid crystal display panel has the structure shown in FIG. 20 and satisfies retardation characteristics Re1=0, Rth1=54 nm; Re2=54.9 nm, Rth2=−58.52 nm; and Re3=0, Rth3=63.6 nm. FIG. 34 is a simulation effect diagram of a contrast of still another liquid crystal display panel shown in FIG. 20 at different visual angles. Comparing with FIG. 3, it can be seen that a visual angle range with a high contrast (light-color area) in FIG. 34 is significantly larger than that in FIG. 3. Moreover, considering a ratio k of a contrast at a cone angle of θ=45° to a contrast of the center, a value of k measured from FIG. 34 is twice as large as a value of k measured based on the structure of FIG. 1. Moreover, it can be seen by comparing FIG. 3 with FIG. 34 that at the same large visual angle, such as a visual angle (45°, 135°), the contrast in FIG. 34 is higher than that in FIG. 3. This means that the liquid crystal display panel based on the design shown in FIG. 20 can have an increased contrast at a large visual angle.

In summary, based on the liquid crystal display panel having the structure shown in FIG. 20, in an embodiment of the present disclosure, the in-plane retardation Re1 of the first retardation film 51 satisfies Re1=0, and the out-of-plane retardation Rth1 of the first retardation film 51 satisfies 54 nm≤Rth1≤126 nm; the in-plane retardation Re2 of the second retardation film 52 satisfies 54.9 nm≤Re2≤128.1 nm, and the out-of-plane retardation Rth2 of the second retardation film 52 satisfies −58.52 nm≤Rth2≤−25.08 nm; and the in-plane retardation Re3 of the third retardation film 53 satisfies Re3=0, and the out-of-plane retardation Rth3 of the third retardation film 53 satisfies 63.6 nm≤Rth3≤148.4 nm.

Within these ranges, the visual angle range of the liquid crystal display panel can be increased.

The above description takes a vertical domain structure as an example to illustrate the functions of the respective retardation films. In a horizontal domain structure in which the orientation of the liquid crystal layer 30 is parallel to the direction of the absorption axis of the first linear polarizer 41, the second retardation film 52 may be arranged between the second linear polarizer 42 and the liquid crystal layer according to an embodiment of the present disclosure, as shown in FIG. 9. Thus, the polarization state of light emitted from the second linear polarizer 42 is adjusted to be parallel to the orientation of the liquid crystals. In a black state, that is, when the liquid crystal layer 30 is not powered up, the polarization state of light emitted from the second retardation film 52 and then passing through the liquid crystal layer 30 will not change. In this way, the final light output effect at a large visual angle will not be affected by the liquid crystals, eliminating an influence of the liquid crystals on light leakage in the black state. Thus, the parameter design for the first retardation film 51 can be applied to the liquid crystal display panels having different cell thicknesses. When the thickness of the liquid crystal cell fluctuates due to factors such as a production line process, the above-mentioned design can still be applied, thereby extending an application scope of the embodiments of the present disclosure.

In addition, in the horizontal domain structure, the orientation of the liquid crystals is consistent with the direction of the absorption axis of the first linear polarizer 41. Therefore, at a large visual angle, polarization of the liquid crystal layer 30 and polarization of the first linear polarizer 41 will have a same degree of deviation. No retardation film needs to be further designed besides the first quarter-wave plate, thereby being advantageous to reduce the thickness of the display panel.

In an embodiment, based on the liquid crystal display panel having the structure shown in FIG. 9, an in-plane retardation Re1 of the first retardation film 51 satisfies Re1=0, and an out-of-plane retardation Rth1 of the first retardation film 51 satisfies 54 nm≤Rth1≤126 nm; an in-plane retardation Re2 of the second retardation film 52 satisfies Re2=0, and an out-of-plane retardation Rth2 of the second retardation film 52 satisfies 140.82 nm≤Rth2≤328.58 nm. An angle between the slow axis of the second retardation film 52 and the absorption axis of the second linear polarizer 42 is 90°. In this embodiment of the present disclosure, the light leakage at various large visual angles in a black state can be alleviated by setting the retardations of the above-mentioned retardation films within the above-mentioned ranges. Thus, the display panel can have a large visual angle range and a high contrast at a front visual angle.

Figure 35:
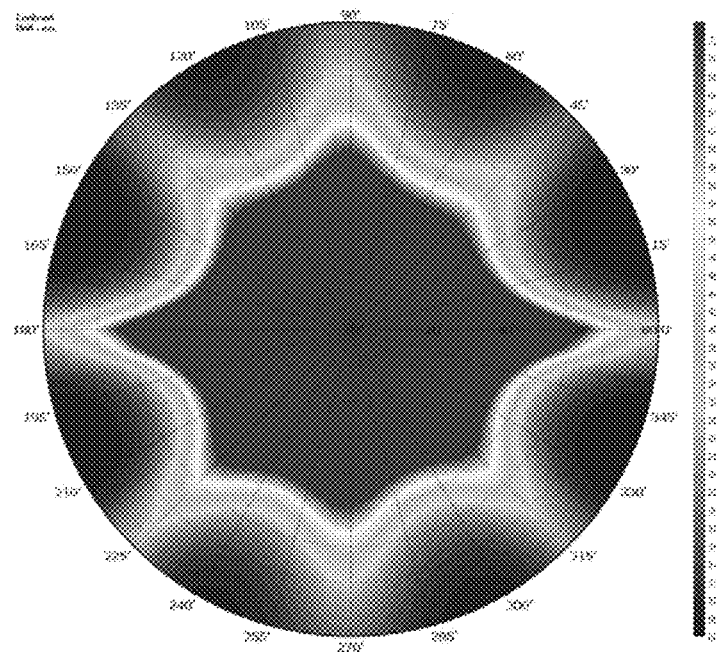
FIG. 35 is a simulation effect diagram of a contrast of a liquid crystal display panel shown in FIG. 9 at different visual angles, in accordance with an embodiment of the present disclosure.

In an embodiment of the present disclosure, the liquid crystal display panel is simulated, where the liquid crystal display panel has the structure shown in FIG. 9 and satisfies retardation characteristics Re1=0, Rth1=90 nm; and Re2=0, Rth2=234.7 nm. FIG. 35 is a simulation effect diagram of a contrast of a liquid crystal display panel shown in FIG. 9 at different visual angles. A visual angle range with a high contrast (light-color area) in FIG. 35 is significantly larger than that in FIG. 3. Moreover, it can be seen by comparing FIG. 3 with FIG. 35 that at the same large visual angle, such as a visual angle (45°, 135°), the contrast in FIG. 35 is higher than that in FIG. 3. This means that the liquid crystal display panel based on the design shown in FIG. 9 can have an increased contrast at a large visual angle.

Figure 36:
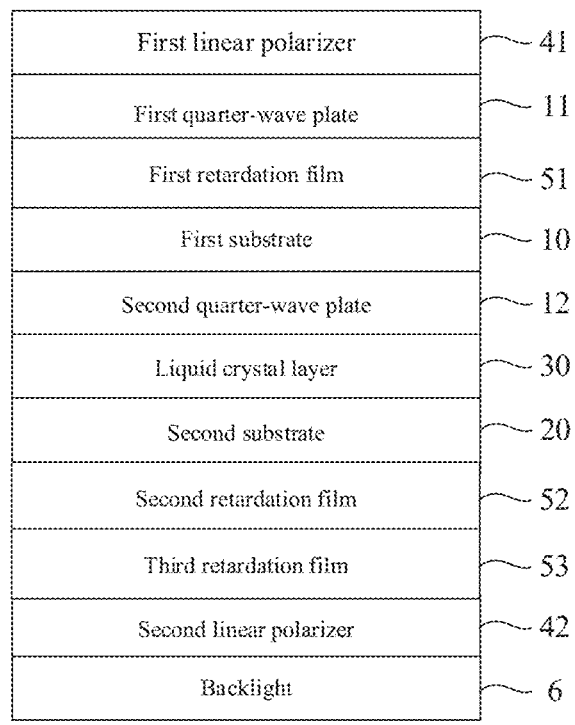
FIG. 36 is a schematic cross-sectional view of still another liquid crystal display panel according to an embodiment of the present disclosure, in accordance with an embodiment of the present disclosure.

In an embodiment, FIG. 36 shows a schematic cross-sectional view of still another liquid crystal display panel according to an embodiment of the present disclosure. As shown in FIG. 36, the liquid crystal display panel further includes a third retardation film 53 disposed between the second retardation film 52 and the second linear polarizer 42. When the polarization state of the light emitted from the second retardation film 52 deviates from an ideal state, the polarization state of the light directed to the liquid crystal layer 30 can be close to a direction where the liquid crystals can receive light, by disposing the third retardation film 53. In this way, a final light output effect at a large visual angle will not be affected by the liquid crystals, and an influence of the liquid crystals on light leakage in the black state is eliminated.

In an example, based on the liquid crystal display panel having the structure shown in FIG. 36, in an embodiment of the present disclosure, an in-plane retardation Re1 of the first retardation film 51 satisfies Re1=0, and an out-of-plane retardation Rth1 of the first retardation film 51 satisfies 54 nm≤Rth1≤126 nm; and an in-plane retardation Re2 of the second retardation film 52 satisfies 12 nm≤Re2≤28 nm, and an out-of-plane retardation Rth2 of the second retardation film 52 satisfies 52.68 nm≤Rth2≤122.92 nm. An angle between the slow axis of the second retardation film 52 and the absorption axis of the second linear polarizer is 90°. An in-plane retardation Re3 of the third retardation film 53 satisfies 24.12 nm≤Re3≤56.28 nm, and an out-of-plane retardation Rth3 of the third retardation film 53 satisfies: 105.9 nm≤Rth3≤247.1 nm. An angle between the slow axis of the third retardation film 53 and the absorption axis of the second linear polarizer 42 is 90°. In this embodiment of the present disclosure, the light leakage at various large visual angles in a black state can be alleviated by setting the retardations of the above-mentioned retardation films within the above-mentioned ranges. Thus, the display panel can have a large visual angle range and a high contrast at a front visual angle.

Figure 37:
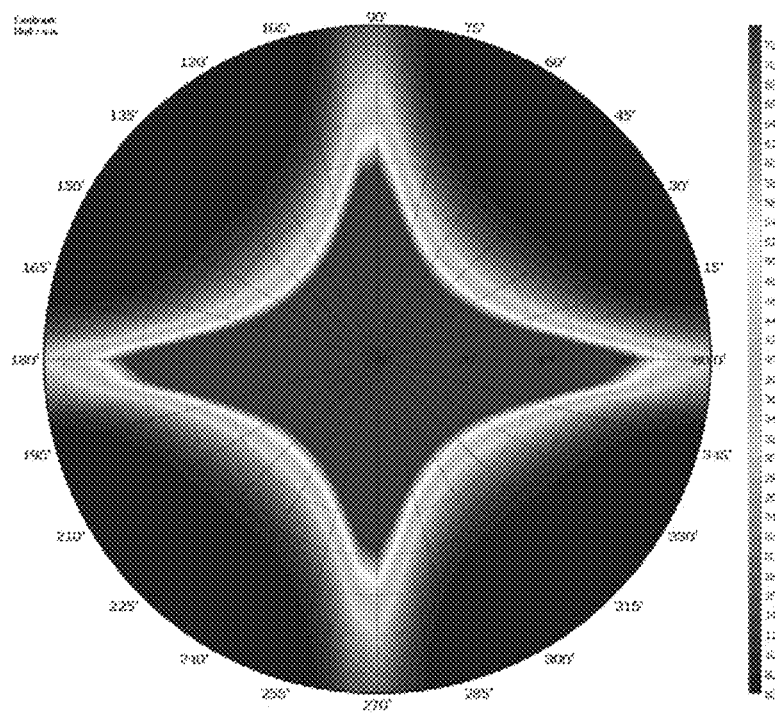
FIG. 37 is a simulation effect diagram of a contrast of a liquid crystal display panel shown in FIG. 36 at different visual angles, in accordance with an embodiment of the present disclosure.

In an embodiment of the present disclosure, the liquid crystal display panel is simulated, where the liquid crystal display panel has the structure shown in FIG. 36 and satisfies retardation characteristics Re1=0, Rth1=90.2 nm; Re2=20 nm, Rth2=87.8 nm; and Re3=40.2 nm, Rth3=176.5 nm. FIG. 37 is a simulation diagram of a contrast. Comparing with FIG. 3, a visual angle range with a high contrast (light-color area) in FIG. 37 is significantly larger than that in FIG. 3. This means that the liquid crystal display panel based on the design shown in FIG. 36 can have an increased contrast at a large visual angle.

Alternatively, based on the liquid crystal display panel having the structure shown in FIG. 36, in an embodiment of the present disclosure, an in-plane retardation Re1 of the first retardation film 51 satisfies Re1=0, and an out-of-plane retardation Rth1 of the first retardation film 51 satisfies 54 nm≤Rth1≤126 nm; and an in-plane retardation Re2 of the second retardation film 52 satisfies 81.12 nm≤Re2≤189.28 nm, and an out-of-plane retardation Rth2 of the second retardation film 52 satisfies −94.64 nm≤Rth2≤−40.56 nm. An angle between the slow axis of the second retardation film 52 and the absorption axis of the second linear polarizer is 90°. An in-plane retardation Re3 of the third retardation film 53 satisfies Re3=0, and an out-of-plane retardation Rth3 of the third retardation film 53 satisfies: 60.9 nm≤Rth3≤142.1 nm. In this embodiment of the present disclosure, the light leakage at various large visual angles in a black state can be alleviated by setting the retardations of the above-mentioned retardation films within the above-mentioned ranges. Thus, the display panel can have a large visual angle range and a high contrast at a front visual angle.

Figure 38:
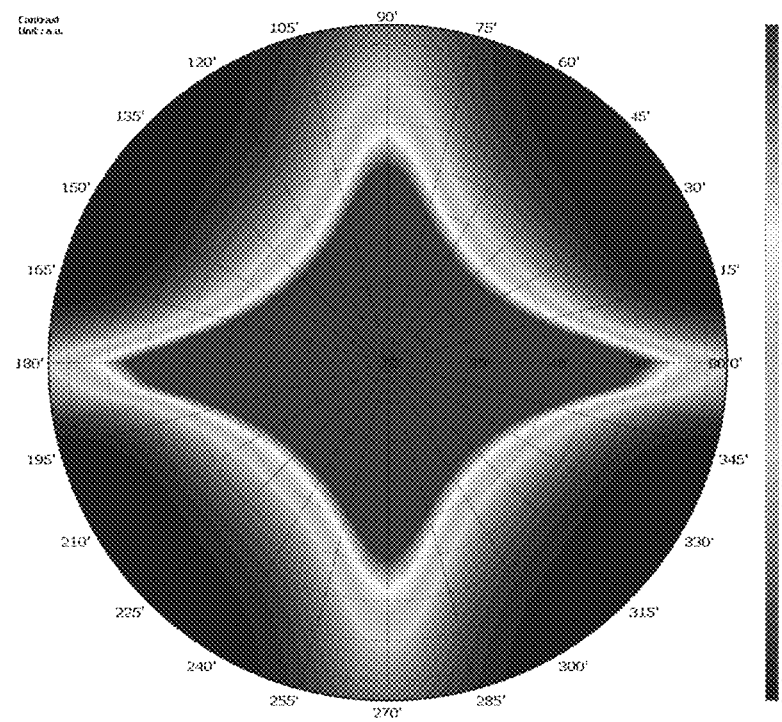
FIG. 38 is a simulation effect diagram of a contrast of a liquid crystal display panel shown in FIG. 36 at different visual angles, in accordance with an embodiment of the present disclosure.

In an embodiment of the present disclosure, the liquid crystal display panel is simulated, where the liquid crystal display panel has the structure shown in FIG. 36 and satisfies retardation characteristics Re1=0, Rth1=90.2 nm; Re2=135.2 nm, Rth2=−67.6 nm; and Re3=0, Rth3=101.5 nm. FIG. 38 is a simulation effect diagram of a contrast of a liquid crystal display panel shown in FIG. 36 at different visual angles. Comparing with FIG. 3, it can be seen that a visual angle range with a high contrast (light-color area) in FIG. 38 is significantly larger than that in FIG. 3. This means that the liquid crystal display panel based on the design shown in FIG. 36 can have an increased contrast at a large visual angle.

In the embodiments of the present disclosure, the types of the first linear polarizer 41 and the second linear polarizer 42 are not particularly limited. For example, each of the first linear polarizer 41 and the second linear polarizer 42 may be of a polymer iodine polyvinyl alcohol type, or may be metal wire grids, or may be formed by dye liquid crystals.

In an embodiment, the first retardation film 51 described above may be disposed between the first substrate 10 and the first linear polarizer 41. That is, the first retardation film 51 may be arranged outside the liquid crystal cell, thereby preventing a manufacturing process of the first retardation film 51 from affecting a manufacturing process of original film layers in the liquid crystal cell.

In an embodiment, the first retardation film 51 may be formed by polymer liquid crystals. The manufacturing process of the polymer liquid crystals may be compatible with the process of the original film layers in the liquid crystal cell, so that the manufacturing process of the first retardation film 51 may be integrated with the manufacturing process of the original film layers in the liquid crystal cell, thereby improving process integration.

In an example, any one of the first quarter-wave plate 11 and second quarter-wave plate 12 described above may also be formed by polymer liquid crystals.

For example, in an embodiment of the present disclosure, the first retardation film 51, the second retardation film 52, and the third retardation film 53 described above may be a single-axis retardation film with one optical axis, or may be a dual-axes retardation film with two optical axes. Herein, the single-axial retardation film may be an A film or a C film, the A film has an optical axis parallel to a plane of the retardation film, and the C film has an optical axis perpendicular to the plane of the retardation film. The dual-axes retardation film is a B film.

Figure 39:
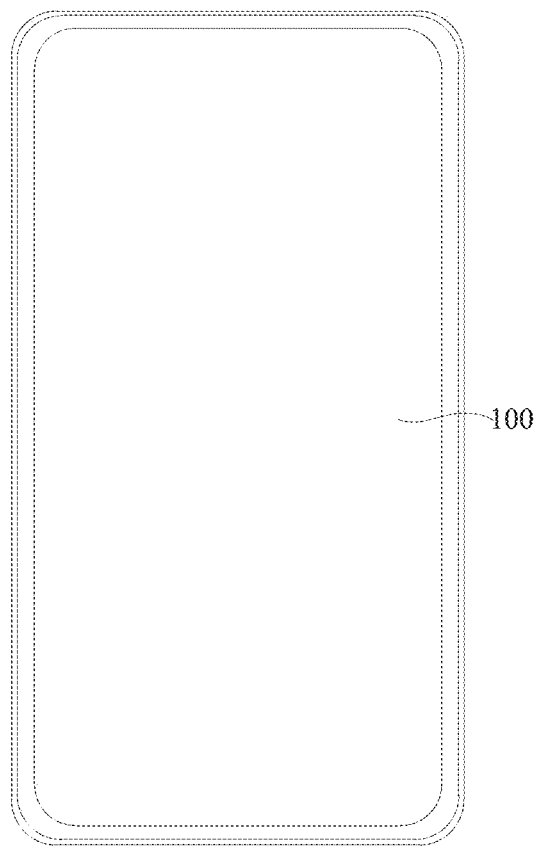
FIG. 39 is a schematic diagram of a display device according to an embodiment of the present disclosure.

A display device is further provided according to an embodiment of the present disclosure. FIG. 39 is a schematic diagram of a display device according to an embodiment of the present disclosure. As shown in FIG. 39, the display device includes the liquid crystal display panel described above. A structure of the display panel 100 has been described in detail in the above-mentioned embodiments, and will not be repeated herein. It should be noted that the display device shown in FIG. 39 is merely for schematic illustration, and the display device may be any electronic device with a display function, such as a mobile phone, a tablet computer, a notebook computer, an electronic paper book, a television, an on-board monitor, etc.

The above-described embodiments are merely preferred embodiments of the present disclosure and are not intended to limit the present disclosure. Any modifications, equivalent substitutions and improvements made within the principle of the present disclosure shall fall into the protection scope of the present disclosure.

What is claimed is:

1. A liquid crystal display panel, comprising:
a first substrate;
a second substrate arranged opposite to the first substrate;
a liquid crystal layer disposed between the first substrate and the second substrate;
a first linear polarizer disposed on a side of the first substrate facing away from the liquid crystal layer;
a first quarter-wave plate disposed between the first substrate and the first linear polarizer, wherein an angle between a slow axis of the first quarter-wave plate and an absorption axis of the first linear polarizer is 45° or 135°;
a second quarter-wave plate disposed between the liquid crystal layer and the first substrate, wherein a slow axis of the second quarter-wave plate is perpendicular to the slow axis of the first quarter-wave plate;
a second linear polarizer disposed at a side of the second substrate facing away from the liquid crystal layer, wherein an absorption axis of the second linear polarizer is perpendicular to the absorption axis of the first linear polarizer;
a first retardation film disposed between the first quarter-wave plate and the second quarter-wave plate; and
a second retardation film disposed at a side of the first quarter-wave plate facing away from the first retardation film, or disposed between the second linear polarizer and the liquid crystal layer,
wherein an in-plane retardation of the first retardation film is Re1, and an out-of-plane retardation of the first retardation film is Rth1, wherein Re1=0, and 54 nm≤Rth1≤126 nm.

2. The liquid crystal display panel according to claim 1, wherein the second retardation film is disposed at the side of the first quarter-wave plate facing away from the first retardation film, and wherein an orientation of the liquid crystal layer is parallel to a direction of the absorption axis of the second linear polarizer.

3. The liquid crystal display panel according to claim 1, wherein an in-plane retardation of the second retardation film is Re2, and an out-of-plane retardation of the second retardation film is Rth2, wherein Re2=0, 211.2 nm≤Rth2≤492.8 nm, and wherein an angle between a slow axis of the second retardation film and the absorption axis of the first linear polarizer is 90°.

4. The liquid crystal display panel according to claim 1, wherein an in-plane retardation of the second retardation film is Re2, and an out-of-plane retardation of the second retardation film is Rth2, wherein 121.2 nm≤Re2≤282.8 nm, Rth2=0, and an angle between a slow axis of the second retardation film and the absorption axis of the first linear polarizer is 0°.

5. The liquid crystal display panel according to claim 1, further comprising:
a third retardation film disposed between the second retardation film and the first linear polarizer.

6. The liquid crystal display panel according to claim 5, wherein an in-plane retardation of the second retardation film is Re2, and an out-of-plane retardation of the second retardation film is Rth2, wherein 19.2 nm≤Re2≤44.8 nm, 84.24 nm≤Rth2≤196.56 nm, and an angle between a slow axis of the second retardation film and the absorption axis of the first linear polarizer is 90°.

7. The liquid crystal display panel according to claim 6, wherein an in-plane retardation of the third retardation film is Re3, and an out-of-plane retardation of the third retardation film is Rth3, wherein 67.68 nm≤Re3≤157.92 nm, −110.32 nm≤Rth3≤−47.28 nm, and an angle between a slow axis of the third retardation film and the absorption axis of the first linear polarizer is 90°.

8. The liquid crystal display panel according to claim 5, wherein an in-plane retardation of the second retardation film is Re2, and an out-of-plane retardation of the second retardation film is Rth2, wherein 54.9 nm≤Re2≤128.1 nm, −58.52 nm≤Rth2≤−25.08 nm, and an angle between a slow axis of the second retardation film and the absorption axis of the first linear polarizer is 0°.

9. The liquid crystal display panel according to claim 8, wherein an in-plane retardation of the third retardation film is Re3, and an out-of-plane retardation of the third retardation film is Rth3, wherein Re3=0, and 63.6 nm≤Rth3≤148.4 nm.

10. The liquid crystal display panel according to claim 1, wherein the second retardation film is disposed between the second linear polarizer and the liquid crystal layer, and an orientation of the liquid crystal layer is parallel to a direction of the absorption axis of the first linear polarizer.

11. The liquid crystal display panel according to claim 10, wherein an in-plane retardation of the second retardation film is Re2, and an out-of-plane retardation of the second retardation film is Rth2, wherein Re2=0, 140.82 nm≤Rth2≤328.58 nm, and an angle between a slow axis of the second retardation film and the absorption axis of the second linear polarizer is 90°.

12. The liquid crystal display panel according to claim 10, further comprising:
a third retardation film disposed between the second retardation film and the second linear polarizer.

13. The liquid crystal display panel according to claim 12, wherein an in-plane retardation of the second retardation film is Re2, and an out-of-plane retardation of the second retardation film is Rth2, wherein 12 nm≤Re2≤28 nm, 52.68 nm≤Rth2≤122.92 nm, and an angle between a slow axis of the second retardation film and the absorption axis of the second linear polarizer is 90°; and
wherein an in-plane retardation of the third retardation film is Re3, and an out-of-plane retardation of the third retardation film is Rth3, wherein 24.12 nm≤Re3≤56.28 nm, 105.9 nm≤Rth3≤247.1 nm, and an angle between a slow axis of the third retardation film and the absorption axis of the second linear polarizer is 90°.

14. The liquid crystal display panel according to claim 12, wherein an in-plane retardation of the second retardation film is Re2, and an out-of-plane retardation of the second retardation film is Rth2, wherein 81.12 nm≤Re2≤189.28 nm, −94.64 nm≤Rth2≤−40.56 nm, and an angle between a slow axis of the second retardation film and the absorption axis of the second linear polarizer is 90°; and wherein an in-plane retardation of the third retardation film is Re3, and an out-of-plane retardation of the third retardation film is Rth3, wherein Re3=0, and 60.9 nm≤Rth3≤142.1 nm.

15. The liquid crystal display panel according to claim 1, wherein at least one of the first quarter-wave plate, the second quarter-wave plate, and the first retardation film comprises polymer liquid crystals.

16. The liquid crystal display panel according to claim 1, wherein the first retardation film is disposed between the first substrate and the first linear polarizer.

17. A display device, comprising a liquid crystal display panel, wherein the liquid crystal display panel comprises:
a first substrate;
a second substrate arranged opposite to the first substrate;
a liquid crystal layer disposed between the first substrate and the second substrate;
a first linear polarizer disposed at a side of the first substrate facing away from the liquid crystal layer;
a first quarter-wave plate disposed between the first substrate and the first linear polarizer, wherein an angle between a slow axis of the first quarter-wave plate and an absorption axis of the first linear polarizer is 45° or 135°;
a second quarter-wave plate disposed between the liquid crystal layer and the first substrate, wherein a slow axis of the second quarter-wave plate is perpendicular to the slow axis of the first quarter-wave plate;
a second linear polarizer disposed at a side of the second substrate facing away from the liquid crystal layer, wherein an absorption axis of the second linear polarizer is perpendicular to the absorption axis of the first linear polarizer;
a first retardation film disposed between the first quarter-wave plate and the second quarter-wave plate; and
a second retardation film disposed at a side of the first quarter-wave plate facing away from the first retardation film, or disposed between the second linear polarizer and the liquid crystal layer,
wherein an in-plane retardation of the first retardation film is Re1, and an out-of-plane retardation of the first retardation film is Rth1, wherein Re1=0, and 54 nm≤Rth1≤126 nm.

18. The display device according to claim 17, wherein the second retardation film is disposed at the side of the first quarter-wave plate facing away from the first retardation film, and wherein an orientation of the liquid crystal layer is parallel to a direction of the absorption axis of the second linear polarizer.

19. The display device according to claim 17, wherein the second retardation film is disposed between the second linear polarizer and the liquid crystal layer, and wherein an orientation of the liquid crystal layer is parallel to a direction of the absorption axis of the first linear polarizer.

* * * * *